(12) United States Patent
Eimura et al.

(10) Patent No.: US 11,794,150 B2
(45) Date of Patent: Oct. 24, 2023

(54) SEPARATION MEMBRANE AND METHOD FOR PRODUCING SEPARATION MEMBRANE

(71) Applicant: Toray Industries, Inc., Tokyo (JP)

(72) Inventors: Hiroki Eimura, Otsu (JP); Koichi Takada, Otsu (JP); Marina Otsuka, Otsu (JP); Masayuki Hanakawa, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/786,707

(22) PCT Filed: Dec. 23, 2020

(86) PCT No.: PCT/JP2020/048299
§ 371 (c)(1),
(2) Date: Jun. 17, 2022

(87) PCT Pub. No.: WO2021/132399
PCT Pub. Date: Jul. 1, 2021

(65) Prior Publication Data
US 2023/0053706 A1    Feb. 23, 2023

(30) Foreign Application Priority Data
Dec. 23, 2019   (JP) .................................. 2019-231580

(51) Int. Cl.
*B01D 69/02*      (2006.01)
*B01D 65/08*      (2006.01)
(Continued)

(52) U.S. Cl.
CPC ............ *B01D 69/02* (2013.01); *B01D 65/08* (2013.01); *B01D 67/0009* (2013.01);
(Continued)

(58) Field of Classification Search
None
See application file for complete search history.

(56) References Cited

U.S. PATENT DOCUMENTS

| 2011/0168628 A1 | 7/2011 | Matsuyama et al. |
| 2013/0140236 A1 | 6/2013 | Tokimi et al. |

(Continued)

FOREIGN PATENT DOCUMENTS

| CN | 101945695 A | 1/2011 |
| CN | 103097007 A | 5/2013 |

(Continued)

OTHER PUBLICATIONS

International Search Report and Written Opinion for International Application No. PCT/JP2020/048299, dated Mar. 2, 2021, with translation, 15 pages.

(Continued)

*Primary Examiner* — Krishnan S Menon
(74) *Attorney, Agent, or Firm* — RatnerPrestia

(57) ABSTRACT

The present invention relates to a separation membrane including a thermoplastic polymer selected from a cellulose ester and a polyamide, in which, when regions obtained by dividing a cross-sectional surface perpendicular to a longitudinal direction of the separation membrane into 5 at an equal interval are defined as regions 1 to 5, all the regions 1 to 5 have a number average pore diameter changing rate $\alpha_i$ of −0.25 to 0.25, and at least one of the regions 1 to 5 is a region P that satisfies conditions (a) and (b): (a) a value of area average pore diameter $D_s$/number average pore diameter $D_n$ is 2.50 to 6.00; and (b) a number average W of fine pores that are located at a distance smaller than $L_a$ from a center of respective coarse pores is 10 to 30.

15 Claims, 5 Drawing Sheets

(51) Int. Cl.

| | |
|---|---|
| *B01D 67/00* | (2006.01) |
| *B01D 69/08* | (2006.01) |
| *B01D 71/22* | (2006.01) |
| *B01D 71/34* | (2006.01) |
| *B01D 71/40* | (2006.01) |
| *B01D 71/44* | (2006.01) |
| *B01D 71/48* | (2006.01) |
| *B01D 71/52* | (2006.01) |
| *B01D 71/56* | (2006.01) |
| *B01D 71/66* | (2006.01) |

(52) U.S. Cl.
CPC ......... *B01D 67/0083* (2013.01); *B01D 69/08* (2013.01); *B01D 71/22* (2013.01); *B01D 71/34* (2013.01); *B01D 71/40* (2013.01); *B01D 71/44* (2013.01); *B01D 71/48* (2013.01); *B01D 71/52* (2013.01); *B01D 71/56* (2013.01); *B01D 71/66* (2013.01); *B01D 2323/12* (2013.01); *B01D 2325/022* (2013.01); *B01D 2325/0283* (2022.08); *B01D 2325/04* (2013.01); *B01D 2325/20* (2013.01); *B01D 2325/24* (2013.01)

(56) References Cited

U.S. PATENT DOCUMENTS

| | | |
|---|---|---|
| 2014/0339164 A1 | 11/2014 | Liang et al. |
| 2018/0065093 A1 | 3/2018 | Takada et al. |
| 2019/0046931 A1 | 2/2019 | Yamamura et al. |
| 2020/0023321 A1 | 1/2020 | Eimura et al. |
| 2020/0038814 A1 | 2/2020 | Takada et al. |
| 2020/0197880 A1 | 6/2020 | Takada et al. |

FOREIGN PATENT DOCUMENTS

| | | |
|---|---|---|
| CN | 107530644 A | 1/2018 |
| CN | 110475606 A | 11/2019 |
| JP | 58074327 A | 5/1983 |
| JP | 2002306937 A | 10/2002 |
| JP | 2003275300 A | 9/2003 |
| JP | 2012020231 A | 2/2012 |
| JP | 2014237125 A | 12/2014 |
| JP | 2017213515 A | 12/2017 |
| JP | 2019111476 A | 7/2019 |
| WO | 2016159333 A1 | 10/2016 |
| WO | 2017131209 A1 | 8/2017 |
| WO | 2018021545 A1 | 2/2018 |
| WO | 2018182027 A1 | 10/2018 |
| WO | 2018182028 A1 | 10/2018 |

OTHER PUBLICATIONS

Japanese Notification of Reasons for Refusal for Japanese Application No. 2021-503175, dated Feb. 15, 2022, with translation, 9 pages.
Japanese Written Explanation of Circumstances Concerning Accelerated Examination for Japanese Application No. 2021-503175, dated Dec. 7, 2021, with translation, 20 pages.
Guillen et al., "Preparation and Characterization of Membranes Formed by Nonsolvent Induced Phase Separation: A Review", 2011, 50, 3798-3817, Industrial & Engineering Chemistry Research.
Chinese Office Action for Chinese Application No. 202080089616.4, dated Jul. 15, 2023 with translation, 25 pages.

SEPARATION MEMBRANE AND METHOD FOR PRODUCING SEPARATION MEMBRANE

CROSS REFERENCE TO RELATED APPLICATIONS

This application is the U.S. National Phase application of PCT/JP2020/048299, filed Dec. 23, 2020, which claims priority to Japanese Patent Application No. 2019-231580, filed Dec. 23, 2019, the disclosures of these applications being incorporated herein by reference in their entireties for all purposes.

FIELD OF THE INVENTION

The present invention relates to a separation membrane and a method of producing a separation membrane.

BACKGROUND OF THE INVENTION

A separation membrane is used in a wide range of fields, such as a water treatment membrane for producing industrial water or drinking water by removing suspended substances or ions from river water, seawater, or sewage, a medical membrane for artificial kidneys or plasma separation, a food and beverage industrial membrane for fruit juice concentration or the like, and a gas separation membrane for separation of carbon dioxide gas or the like.

Most of the separation membranes are formed of a polymer. Among them, a separation membrane formed of a cellulose-based resin and a nylon-based resin, which are hydrophilic resins, has a feature of excellent permeation performance. The cellulose-based resin is also widely used as a separation membrane such as a water treatment membrane because of chlorine resistance, which is strong against chlorine-based bactericides. The nylon-based resin is used as an organic solvent filtration membrane because of solvent resistance.

The separation membrane is required to have high permeation performance and separation performance, but the permeation performance and the separation performance are in a trade-off relationship. Therefore, it is difficult to improve the permeation performance and the separation performance at the same time, and various studies have been made.

In addition to the permeation performance and the separation performance, high membrane strength is also important as the separation membrane in order to prevent the membrane from being physically broken during modularization or filtration and becoming a defect. By decreasing the proportion of pores in the membrane, that is, by decreasing the porosity, the membrane strength can be increased. However, since the permeation performance is also decreased at the same time, the permeation performance and the membrane strength are also in a trade-off relationship.

For example, Patent Literature 1 discloses a technique of improving the permeation performance of a cellulose ester separation membrane while maintaining separation performance by providing grooves and voids in a surface or a cross-sectional surface.

Patent Literature 2 discloses a technique of achieving high permeation performance and high strength by immersing a resin composition in a solvent to cause phase separation to obtain a uniform structure having a high porosity.

Patent Literature 3 discloses a technique for obtaining a composite structure having a plurality of layers having different pore diameters in a separation membrane. Patent Literature 4 and Non-Patent Literature 1 disclose a technique for obtaining a separation membrane having both permeation performance and separation performance by providing an inclined structure in which a pore diameter gradually changes from one surface in a direction perpendicular to a membrane surface.

Patent Literature 5 discloses a technique related to a separation membrane having a double phase separation structure obtained by combining phase separation using heat and a solvent. Here, the double phase separation structure is a structure having coarse pores and fine pores in a skeleton that forms the coarse pores.

Patent Literature 6 discloses a technique for phase-separating a solution in which water-soluble salt particles are dispersed to obtain a separation membrane having fine pores formed by the phase separation and coarse pores formed by dissolving and removing the water-soluble salt particles.

PATENT LITERATURE

Patent Literature 1: WO 2016/159333
Patent Literature 2: WO 2018/182028
Patent Literature 3: JP-A-2019-111476
Patent Literature 4: JP-A-2002-306937
Patent Literature 5: JP-A-2017-213515
Patent Literature 6: JP-A-2014-237125

NON-PATENT LITERATURE

Non-Patent Literature 1: Ind. Eng. Chem. Res. 2011, 50, 3798-3817

SUMMARY OF THE INVENTION

However, in recent years, not only the type and concentration of components contained in a liquid-to-be-treated have been increased, but also required characteristics of a separation membrane have been further increased to perform filtration under severe operating conditions. Even in a conventional separation membrane, there has been a problem that, when an actual liquid is filtered for a long time, clogging due to fouling or membrane breakage occurs and the permeation performance and the removal performance decrease.

In the method described in Patent Literature 1, the void structure is small, and the permeation performance is insufficient.

Since the separation membrane described in Patent Literature 2 has a uniform structure, separation performance and membrane strength are high, but there is a problem in permeation performance.

In the separation membranes described in Patent Literatures 3 and 4, fine pores are concentrated in a layer or a region responsible for separation performance. Therefore, once clogging occurs in that portion, the water permeability rapidly decreases, and therefore, it is difficult to perform filtration for a long period of time.

In the separation membrane described in Patent Literature 5, a fractionated particle diameter and a surface pore diameter coincide with each other, and the contribution to the permeation performance of the fine pores inside the separation membrane is small. Since the membranes obtained by the methods of Patent Literatures 4 and 5 have an inclined structure, the membrane strength is small, and it is difficult to produce a small-diameter hollow-fiber membrane. In addition, when nylon is used as a main component, nylon has poor solubility in a solvent, and thus it is necessary to increase the temperature of a first coagulation bath. Therefore, it is difficult to apply the production method described in Patent Literature 5 to the separation membrane containing nylon as a main component.

In Patent Literature 6, water-soluble salt particles are used, but the membrane strength to be obtained cannot withstand practical use since the particles are not uniformly dispersed in a solution and a uniform structure cannot be obtained.

Accordingly, an object of the present invention is to provide a separation membrane having high membrane strength and capable of maintaining high permeation performance and removal performance for a long period of time.

As a result of intensive studies to solve the above problems, the present inventors have found that it is important to have coarse pores and fine pores and to have a certain number of the fine pores around the coarse pores in order to have high membrane strength and to maintain high permeation performance and removal performance for a long period of time, and have completed the present invention.

The present invention relates to the following [1] to [20].

[1] A separation membrane including, as a main component A, a thermoplastic polymer selected from the group consisting of a cellulose ester and a polyamide, in which, when regions obtained by dividing a cross-sectional surface perpendicular to a longitudinal direction of the separation membrane into 5 at an equal interval in order from one surface of the separation membrane in a thickness direction of the separation membrane are defined as regions 1 to 5, all the regions 1 to 5 have a number average pore diameter changing rate $\alpha_i$ of −0.25 or more and 0.25 or less, and at least one of the regions 1 to 5 is a region P that satisfies the following conditions (a) and (b):
  (a) a value of area average pore diameter $D_s$/number average pore diameter $D_n$ is 2.50 or more and 6.00 or less; and
  (b) when a pore having a pore diameter larger than the area average pore diameter $D_s$ is defined as a coarse pore, a pore having a pore diameter smaller than the number average pore diameter $D_n$ is defined as a fine pore, and an average of closest distance between coarse pores is defined as $L_a$, a number average W of the fine pores that are located at a distance smaller than $L_a$ from a center of the respective coarse pores is 10 or more and 30 or less.

[2] The separation membrane according to [1], in which an area ratio occupied by the fine pores in the region P is 3% or more and 20% or less.

[3] The separation membrane according to [1] or [2], in which $(L_a-D_s)/D_n$ of the region P is 2.1 or more and 7.5 or less.

[4] The separation membrane according to any one of [1] to [3], in which a variation coefficient of $L_a$ in the region P is 50% to 0.1%.

[5] The separation membrane according to any one of [1] to [4], in which all of the regions 1 to 5 are the region P.

[6] The separation membrane according to any one of [1] to [5], in which an area ratio of pores having a pore diameter of 1600 nm to 3000 nm to all pores in the region P is 50% or more.

[7] The separation membrane according to any one of [1] to [6], in which a variation coefficient of the pores having a pore diameter of 1600 nm to 3000 nm in the region P is 40% or less.

[8] The separation membrane according to any one of [1] to [7], in which a content of the main component A is 95 mass % or more when a total content of components of the separation membrane is defined as 100 mass %.

[9] The separation membrane according to any one of [1] to [8], further including a hydrophilic polymer other than the main component A, in which an element ratio of the hydrophilic polymer to the main component A is 15 atomic % or more in a surface concentration calculated by X-ray photoelectron analysis (ESCA) measurement.

[10] The separation membrane according to any one of [1] to [9], further including at least one selected from the group consisting of a cellulose ester, a cellulose ether, a polyamide, a poly-fatty acid vinyl ester, polyvinylpyrrolidone, polyethylene oxide, polypropylene oxide, a polyacrylic acid ester, a polymethacrylic acid ester, and a copolymer thereof as a component other than the main component A.

[11] The separation membrane according to any one of [1] to [10], further including at least one selected from the group consisting of a polyacrylic acid ester, a polymethacrylic acid ester, and a copolymer thereof as a component other than the main component A.

[12] The separation membrane according to any one of [1] to [10], further including at least one selected from the group consisting of a polyvinylpyrrolidone and a copolymer containing a polyvinylpyrrolidone component as a component other than the main component A.

[13] The separation membrane according to [12], further including a copolymer of fatty acid vinyl and vinylpyrrolidone as a component other than the main component A.

[14] The separation membrane according to any one of [1] to [13], having a hollow fiber shape.

[15] The separation membrane according to any one of [1] to [14], in which an area ratio occupied by macro voids to an entire cross-sectional area in the cross-sectional surface perpendicular to the longitudinal direction of the separation membrane is 10% or less.

[16] A method of producing a separation membrane including a cellulose ester as a main component, the method including the following steps (1) to (3):
  (1) a resin composition preparing step of melt-kneading 15 wt % or more and 40 wt % or less of a cellulose ester, 40 wt % or more and 84 wt % or less of a subcomponent B having a number average molecular weight of 200 or more and being compatible with the main component, and 1 wt % or more and 20 wt % or less of a subcomponent C being incompatible with the main component to prepare a resin composition;
  (2) a forming step of forming the resin composition by discharging the resin composition from a discharging mouthpiece to prepare a resin formed product in which each component is uniformly dispersed; and
  (3) an immersion step of immersing the resin formed product in a solvent θ having a solubility parameter distance Ra with respect to the main component in a range of 10 or more and 25 or less.

[17] The method of producing a separation membrane according to [16], in which the solvent θ in the immersion step includes an organic solvent, and the organic solvent has a solubility parameter distance Ra with respect to the main component in a range of 4 or more and 12 or less.

[18] The method of producing a separation membrane according to [16] or [17], further including a heat treatment step.

[19] A method of producing a separation membrane including a polyamide as a main component, the method including the following steps (1) to (3):
(1) a resin composition preparing step of melt-kneading 15 wt % or more and 40 wt % or less of a polyamide, 40 wt % or more and 84 wt % or less of a subcomponent B having a number average molecular weight of 200 or more and being compatible with the main component, and 1 wt % or more and 20 wt % or less of a subcomponent C being incompatible with the main component to prepare a resin composition;
(2) a forming step of forming the resin composition by discharging the resin composition from a discharging mouthpiece to prepare a resin formed product in which each component is uniformly dispersed; and
(3) an immersion step of immersing the resin formed product in a solvent having δh of a Hansen solubility parameter of 10 or more.

[20] The method of producing a separation membrane according to any one of [16] to [19], in which a polyethylene glycol having a number average molecular weight of 1000 or more is used as the subcomponent C.

According to the present invention, it is possible to provide a separation membrane having high membrane strength and capable of maintaining high permeation performance and removal performance for a long period of time.

DETAILED DESCRIPTION OF EMBODIMENTS OF THE INVENTION

Figure 1:
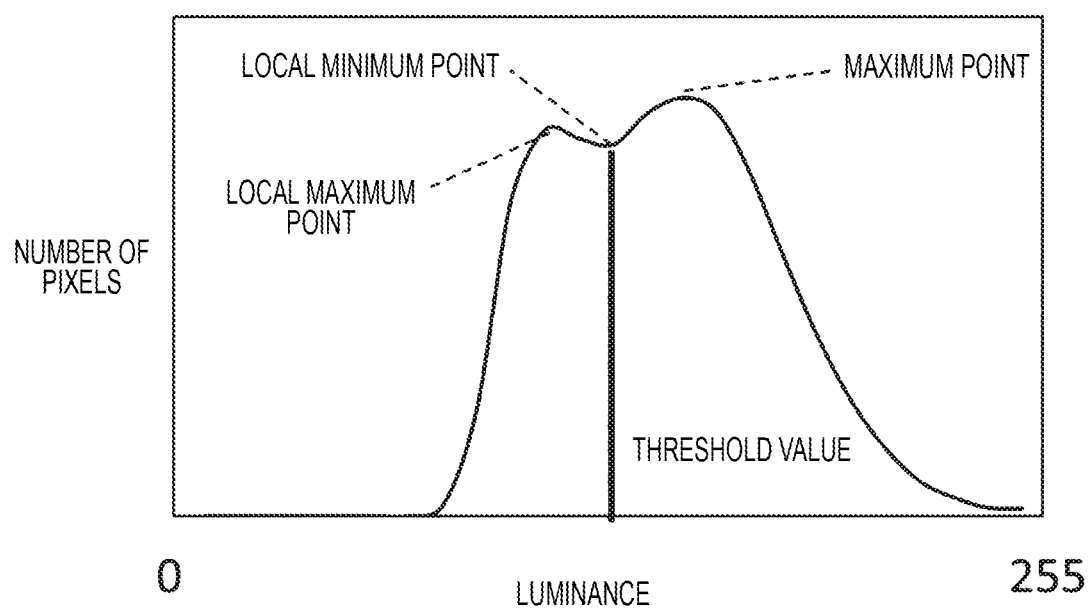
FIG. 1 is a schematic view showing a distribution of the number of pixels, in which a horizontal axis represents a luminance in an analysis image and a vertical axis represents the number of pixels for the corresponding luminance.

Hereinafter, embodiments of the present invention will be described in detail, but the present invention is not limited thereto. In the present specification, a proportion on a mass basis (percentage, part, etc.) is the same as a ratio on a weight basis (percentage, part, etc.).

A separation membrane of the present invention includes, as a main component A, a thermoplastic polymer selected from the group consisting of a cellulose ester and a polyamide. When regions obtained by dividing a cross-sectional surface perpendicular to a longitudinal direction of the separation membrane into 5 at an equal interval in order from one surface of the separation membrane in a thickness direction of the separation membrane are defined as regions 1 to 5, all the regions 1 to 5 have a number average pore diameter changing rate $\alpha_i$ of −0.25 or more and 0.25 or less. At least one of the regions 1 to 5 is a region P that satisfies the following conditions (a) and (b).
(a) Area average pore diameter $D_s$/number average pore diameter $D_n$ is 2.50 or more and 6.00 or less.
(b) When a pore having a pore diameter larger than the area average pore diameter $D_s$ is defined as a coarse pore, a pore having a pore diameter smaller than the number average pore diameter $D_n$ is defined as a fine pore, and an average of closest distance between coarse pores is defined as $L_a$, a number average W of the fine pores that are located at a distance smaller than $L_a$ from a center of the respective coarse pores is 10 or more and 30 or less.

(Resin Composition as Raw Material of Separation Membrane)

The separation membrane of the present invention includes the main component A selected from the group consisting of a cellulose ester and a polyamide. Here, the term "main component" means a component contained in the largest amount on a mass basis among all components of the separation membrane.

The separation membrane of the present invention can be formed, for example, by discharging a resin composition as a raw material from a discharging mouthpiece. The resin composition contains the main component A described in (1) below. The resin composition may further contain a subcomponent B described in (2), a subcomponent C described in (3), and/or an additive described in (4).

(1) Main Component A

The main component A contained in the separation membrane of the present invention is a thermoplastic polymer selected from the group consisting of a cellulose ester and a polyamide. When a liquid-to-be-treated is water, the main component A is preferably either a cellulose ester or a polyamide, and particularly preferably a cellulose ester having higher hydrophilicity. Meanwhile, when the liquid-to-be-treated is an organic solvent, the main component A is preferably a polyamide.

Examples of a cellulose ester include cellulose esters such as cellulose acetate, cellulose propionate, and cellulose butyrate, cellulose acetate propionate, and cellulose acetate butyrate. Examples of a polyamide include nylon 6, nylon 66, nylon 610, nylon 11, MXD nylon, and nylon 12.

As for the cellulose ester, a weight average molecular weight (Mw) of the cellulose ester calculated by gel permeation chromatography (GPC) measurement is preferably 50000 to 250000. When the weight average molecular weight (Mw) is 50000 or more, thermal decomposition at the time of melting the cellulose ester during the production of the separation membrane is prevented, and the membrane strength of the separation membrane becomes sufficient. Meanwhile, when the weight average molecular weight (Mw) is 250000 or less, the melt viscosity does not become excessively high, and stable melt membrane formation can be performed.

For the polyamide, a relative viscosity is preferably 2.00 or more and 7.00 or less, and preferably 2.50 or more and 6.50 or less. When the relative viscosity is 2 or more, the membrane strength of the membrane becomes sufficient. Meanwhile, when the relative viscosity is 7.00 or less, the melt viscosity does not become excessively high, and stable melt membrane formation can be performed.

The content of the main component A of the separation membrane of the present invention is, when the total component of the separation membrane is regarded as 100 mass %, preferably 90 mass % to 100 mass %, more preferably 95 mass % to 100 mass %, and particularly preferably 98 mass % to 100 mass % in order to make it sufficient.

(2) Subcomponent B

The separation membrane of the present invention may contain a subcomponent B. The subcomponent B is a compound having a number average molecular weight of 200 or more and being compatible with the main component. The subcomponent B is preferably a compound that allows a resin composition to satisfy the following conditions 1 and 2, the resin composition being obtained by melt-kneading and rapidly-quenching the main component A and the compound so as to be 80 mass % and 20 mass %, respectively, when the total amount of the components is 100 mass %.

1. In a temperature rising process of differential scanning calorimetry of the resin composition, only one glass transition point is present.
2. In the temperature rising process of the differential scanning calorimetry of the resin composition, a crystal melting peak derived from the compound is not observed.

When the above conditions are satisfied, the resin formed product is likely to be in a uniform state even under the conditions where the main component A and the subcomponent C described later are present, and the obtained separation membrane is likely to exhibit good permeation performance and separation performance.

The temperature of the melt-kneading is preferably a higher temperature of a melting point of the main component +20° C. or a glass transition temperature +20° C. As the subcomponent B, a plurality of compounds may be used as long as the individual compounds are compatible with the main component.

The subcomponent B is preferably a hydrophilic polymer (hydrophilic polymer other than the main component A). When the subcomponent B is a hydrophilic polymer, fouling can be prevented when the hydrophilic polymer remains in the separation membrane. The "hydrophilic polymer" is a polymer having a hydrophilic group, and a contact angle between water and a coating film formed of the polymer is 60° or less. Here, the "hydrophilic group" refers to a hydroxyl group, a carboxyl group, a carbonyl group, an amino group, a pyrrolidone group, an amide group and the like.

Examples of the hydrophilic polymer include a polyester, a polyamide, polyacrylic acid esters such as polymethyl acrylate, a polymethacrylic acid ester, a poly-fatty acid vinyl ester, polyvinylpyrrolidone, a cellulose ester, a cellulose ether, polyethylene oxide, polypropylene oxide, and a copolymer thereof. At least one selected from the group consisting of a cellulose ester, a cellulose ether, a polyamide, a poly-fatty acid vinyl ester, polyvinylpyrrolidone, polyethylene oxide, polypropylene oxide, a polyacrylic acid ester, a polymethacrylic acid ester, and a copolymer thereof is preferable. The hydrophilic polymer is more preferably at least one selected from the group consisting of a polyacrylic acid ester, a polymethacrylic acid ester, and a copolymer thereof. Alternatively, the hydrophilic polymer is more preferably at least one selected from the group consisting of polyvinylpyrrolidone and a copolymer containing a polyvinylpyrrolidone component. As at least one selected from the group consisting of polyvinylpyrrolidone and a copolymer containing a polyvinylpyrrolidone component, polyvinylpyrrolidone or a copolymer of fatty acid vinyl and vinylpyrrolidone is more preferable, and a copolymer of fatty acid vinyl and vinylpyrrolidone is still more preferable. Examples of the polyamide include nylon 6 and nylon 11. Examples of the cellulose ester include cellulose esters such as cellulose acetate, cellulose propionate, and cellulose butyrate, cellulose acetate propionate and cellulose acetate butyrate.

When the main component A is cellulose acetate propionate, as the subcomponent B, at least one selected from the group consisting of polyvinylpyrrolidone and a copolymer containing a polyvinylpyrrolidone component is preferable, polyvinylpyrrolidone or a copolymer of fatty acid vinyl and vinylpyrrolidone is more preferable, and a random copolymer of fatty acid vinyl and vinylpyrrolidone is still more preferable. By using the above compound, good permeation performance is exhibited.

In the case where the main component A is a polyamide, as the subcomponent B, polyvinylpyrrolidone, a copolymer of fatty acid vinyl and vinylpyrrolidone, and polyvinyl alcohol are preferable, and polyvinylpyrrolidone and polyvinyl alcohol are particularly preferable.

By using the above compound as the subcomponent B, the resin composition can be made uniform. In addition, in order to improve processability in the production process, it is preferable that the subcomponent B contains polyethylene glycol having a number average molecular weight of less than 1000. In this case, the number average molecular weight of the polyethylene glycol is more preferably 200 or more and less than 1000, and particularly preferably 400 or more and less than 1000.

The weight average molecular weight (Mw) of the subcomponent B calculated by GPC measurement is preferably 600 to 50000, more preferably 1000 to 50000, and particularly preferably 5000 to 50000. When the weight average molecular weight (Mw) is within the above range, elution in the immersion step described later is prevented, and the membrane strength of the separation membrane becomes sufficient. Meanwhile, when the weight average molecular weight (Mw) is 50000 or less, the melt viscosity does not become excessively high, and stable melt membrane formation can be performed.

The number average molecular weight (Mn) of the subcomponent B calculated by GPC measurement is preferably 600 to 50000, more preferably 1000 to 50000, and particularly preferably 5000 to 50000. When the number average molecular weight (Mn) is within the above range, elution in the immersion step described later is prevented, and the membrane strength of the separation membrane becomes sufficient. Meanwhile, when the number average molecular weight (Mn) is 50000 or less, the melt viscosity does not become excessively high, and stable melt membrane formation can be performed.

In the separation membrane of the present invention, in order to maintain the membrane strength, a ratio of the subcomponent B to all the components is preferably 10 mass % to 0 mass %, and more preferably 5 mass % to 0 mass %. The ratio of the subcomponent B to the main component A can be obtained by IR measurement.

(3) Subcomponent C

The separation membrane of the present invention may contain a subcomponent C. The subcomponent C is a hydrophilic polymer (hydrophilic polymer other than the main component A) being incompatible with the main component. The subcomponent C is preferably a compound that allows a resin composition to satisfy the following conditions 1 or 2, the resin composition being obtained by melt-kneading and rapidly-quenching the main component A and the compound so as to be 80 mass % and 20 mass %, respectively, when the total amount of the components is 100 mass %.

1. In a temperature rising process of differential scanning calorimetry of the resin composition, a glass transition point is 2 or more.
2. In the temperature rising process of the differential scanning calorimetry of the resin composition, a crystal melting peak derived from the compound is observed.

As the subcomponent C, a plurality of compounds may be used as long as the individual compounds are incompatible with the main component.

In the present invention, in order to exhibit good processability, the subcomponent C is preferably compatible with the subcomponent B. Here, the subcomponent C being compatible with the subcomponent B is a compound that allows a resin composition to satisfy the following conditions 1 or 2, the resin composition being obtained by melt-kneading and rapidly-quenching the subcomponent B and the subcomponent C so as to be 80 mass % and 20 mass %, respectively, when the total amount of the components is 100 mass %.

1. In a temperature rising process of differential scanning calorimetry of the resin composition, only one glass transition point is present.
2. In the temperature rising process of the differential scanning calorimetry of the resin composition, a crystal melting peak derived from the compound is not observed.

Specific examples of the hydrophilic polymer that can be used as the subcomponent C include the hydrophilic polymer exemplified as the hydrophilic polymer in the subcomponent B, and polyethylene glycol. The subcomponent C is preferably polyethylene glycol, and the number average molecular weight thereof may be appropriately selected in accordance with the main component, and is, for example, preferably 600 or more, and more preferably 1000 or more.

When the main component is cellulose acetate propionate, as the subcomponent C, polyethylene glycol having a number average molecular weight of 2000 or more is preferable, polyethylene glycol having a number average molecular weight of 2000 or more and 9000 or less is more preferable, polyethylene glycol having a number average molecular weight of 3000 or more and 9000 or less is still more preferable, and polyethylene glycol having a number average molecular weight of 3000 or more and 6000 or less is particularly preferable. When the number average molecular weight of the polyethylene glycol is smaller than the above range, the compatibility with the cellulose ester becomes too high, and thus the permeation performance of the obtained separation membrane is likely to decrease. When the number average molecular weight of the polyethylene glycol is higher than the above range, it is likely to be difficult to make the resin formed product compatible, and the separation performance of the obtained separation membrane is likely to decrease.

When the main component is a polyamide, polyethylene glycol having a number average molecular weight of 600 or more is preferable as the subcomponent C. The number average molecular weight of the polyethylene glycol is preferably 3000 or less, and more preferably 2000 or less. As the subcomponent C, polyethylene glycol having a number average molecular weight of 600 or more and 1000 or less is particularly preferable. By using the above compound as the subcomponent C, the resin composition can be made uniform, and a separation membrane having a uniform shape can be obtained. When the number average molecular weight of the polyethylene glycol is smaller than the above range, the compatibility with the polyamide becomes too high, and thus the permeation performance of the obtained separation membrane is likely to decrease. When the number average molecular weight of the polyethylene glycol is higher than the above range, it is likely to be difficult to make the resin formed product compatible, and the separation performance of the obtained separation membrane is likely to decrease.

In order to maintain the membrane strength of the separation membrane, the ratio of the subcomponent C to all the components is preferably 10 mass % to 0 mass %, and more preferably 5 mass % to 0 mass %. The ratio of the subcomponent C to the main component A can be obtained by IR measurement.

(4) Additives

The resin composition constituting the separation membrane of the present invention may contain an additive other than the main component A, the subcomponent B, and the subcomponent C as long as the effects of the present invention are not impaired.

Examples of the additive include resins such as cellulose ether, polyacrylonitrile, polyolefin, a polyvinyl compound, polycarbonate, poly(meth)acrylate, polysulfone, and polyether sulfone, an organic lubricant, a crystal nucleating agent, an organic particle, an inorganic particle, a terminal blocking agent, a chain extender, an ultraviolet absorber, an infrared absorber, a coloring inhibitor, a matting agent, an antibacterial agent, an electro depressant, a deodorant, a flame retardant, a weathering agent, an antistatic agent, an antioxidant, an ion exchanger, a defoaming agent, a coloring pigment, a fluorescent brightener or a dye.

(Shape of Separation Membrane)

A shape of the separation membrane of the present invention is not particularly limited, but a separation membrane having a fiber shape with hollow, that is, a hollow fiber shape (hereinafter, referred to as a "hollow-fiber membrane") or a separation membrane having a planar shape (hereinafter, referred to as a "flat membrane") is preferable. Among them, the hollow-fiber membrane is more preferable because a module can be filled with hollow-fiber membranes with high efficiency and an effective membrane area per unit volume of the module can be increased.

A thickness of the separation membrane is preferably 10 μm to 500 μm, more preferably 30 μm to 200 μm, still more preferably 30 μm to 150 μm, and particularly preferably 50 μm to 100 μm, from the viewpoint of achieving both permeation performance and membrane strength.

When the separation membrane is a hollow-fiber membrane, an outer diameter of the hollow-fiber membrane is preferably 50 μm to 2500 μm, more preferably 100 μm to 1500 μm, still more preferably 200 μm to 1000 μm, and particularly preferably 300 μm to 600 μm, from the viewpoint of achieving both the effective membrane area when the module is filled with the membrane and the membrane strength.

When the separation membrane is a hollow-fiber membrane, a hollow ratio of the hollow-fiber membrane is preferably 15% to 70%, more preferably 20% to 65%, and still more preferably 25% to 60%, from the relationship between a pressure loss of a fluid flowing through a hollow portion and a buckling pressure.

Examples of a method for adjusting the outer diameter and the hollow ratio of the hollow fiber to fall within the above ranges include changing a shape of a hole of the discharging mouthpiece or a draft ratio represented by a winding speed divided by a discharging speed during production of the hollow-fiber membrane.

(Cross-Sectional Structure of Membrane)

The separation membrane of the present invention is a separation membrane containing, as the main component A, a thermoplastic polymer selected from a cellulose ester and a polyamide.

When regions obtained by dividing a cross-sectional surface perpendicular to a longitudinal direction of the separation membrane into 5 at an equal interval in order from one surface of the separation membrane in a thickness direction of the separation membrane are defined as regions 1 to 5, all regions 1 to 5 have a number average pore diameter changing rate $\alpha_i$ of −0.25 or more and 0.25 or less, and at least one of the regions 1 to 5 is a region P that satisfies the following conditions (a) and (b).

(a) Area average pore diameter $D_s$/number average pore diameter $D_n$ is 2.50 or more and 6.00 or less.

(b) When an average of closest distance between coarse pores which have a pore diameter larger than the area average pore diameter is defined as $L_a$, a number average W of the fine pores that are located at a distance smaller than $L_a$ from a center of the respective coarse pores and that have a pore diameter smaller than the number average pore diameter is 10 or more and 35 or less.

Here, the thickness direction of the membrane is a direction perpendicular to the surface in the case of a flat membrane, and is a direction perpendicular to the longitudinal direction in the case of a hollow-fiber membrane.

In order to calculate the area average pore diameter $D_s$, the number average pore diameter $D_n$, and the number average pore diameter changing rate $\alpha_i$, it is necessary to calculate the pore diameter of each pore in the separation membrane.

As a method of calculating the pore diameter of each hole in the separation membrane, first, the cross-sectional surface perpendicular to the longitudinal direction of the separation membrane is observed at a magnification of 5000 times using a scanning electron microscope (SEM). In the case of a flat membrane, the cross-sectional surface perpendicular to the longitudinal direction is a cross-sectional surface perpendicular to the membrane surface.

The regions 1 to 5 obtained by dividing at an equal interval in order from one surface of the separation membrane in the thickness direction of the separation membrane, are set. In the case of a hollow-fiber membrane, a region on an outer surface side is set as the region 1. In the case of a flat membrane, a region having a small number average pore diameter, which will be described later, of the two surfaces is set as the region 1. In each of the set regions, a microscopic image of a square of (membrane thickness/5) μm× (membrane thickness/5) μm is acquired, and the pore diameters of all the pores included in the image are calculated. When the membrane thickness is 50 μm or less, a microscopic image of a rectangle in which one side in the membrane thickness direction is (membrane thickness/5) μm and one side in the direction perpendicular to the membrane thickness direction is 20 μm is acquired, and the pore diameters of all the pores included in the image are calculated. For the regions 1 and 5 in contact with the surface of the membrane, one side of the microscope field of view should be the membrane surface. For the regions 2 to 4, microscope observation is performed with the center of each region as the center of the microscope field of view. The extraction of pores is performed after the analysis image is binarized in image analysis software "ImageJ". FIG. 1 shows a distribution of the number of pixels, in which a horizontal axis represents a luminance in the analysis image and a vertical axis represents the number of pixels in the corresponding luminance. For a threshold value for binarization, a local minimum point between the maximum point of the number of pixels and a local maximum point where the luminance is closest to the maximum point is set as a threshold value, a portion where the luminance is smaller than the threshold value is set as a pore, and an area of the pore is determined through a particle analysis. When the number of local maximum points is less than two, an inflection point in the middle of a shoulder peak on a side where the luminance of the maximum point becomes smaller is set as the threshold value. Further, an image obtained by subjecting the obtained binarized image to noise removal (corresponding to Despeckle in ImageJ) of replacing all pixels with a median value of 3×3 pixels in the vicinity of the pixels 10 times is used as an analysis image. The pores are extracted by an Analyze Particles command of ImageJ. A pore diameter d of each pore is calculated from the following formula (1) by measuring the area of the pore by image processing and assuming a perfect circular pore having the same area.

[Math 1]

$$d=2\times(s/\pi)^{0.5} \qquad \text{Formula (1) (s: area of pore)}$$

The area average pore diameter in each region is an average pore diameter obtained by weighting with a pore area ratio of the pores extracted in each region to the total area of all the pores. That is, the area average pore diameter is calculated from the following formula (2).

[Math 2]

$$D_s = \sum d_i \times \frac{s_i}{s} \qquad \text{Formula (2)}$$

($d_i$: pore diameter of each pore, $s_i$: total area of pores having pore diameter of $d_i$, S: total area of all pores)

The number average pore diameter in each region is an average pore diameter obtained by weighting with a number ratio of the pores extracted in each region to the number of all pores, and is an arithmetic average of d. That is, the number average pore diameter is calculated from the following formula (3).

[Math 3]

$$D_n = \sum d_i \times \frac{n_i}{N} \qquad \text{Formula (3)}$$

($d_i$: pore diameter of each pore, $n_i$: total number of pores having pore diameter of $d_i$, N: total number of all pores)

Figure 2:
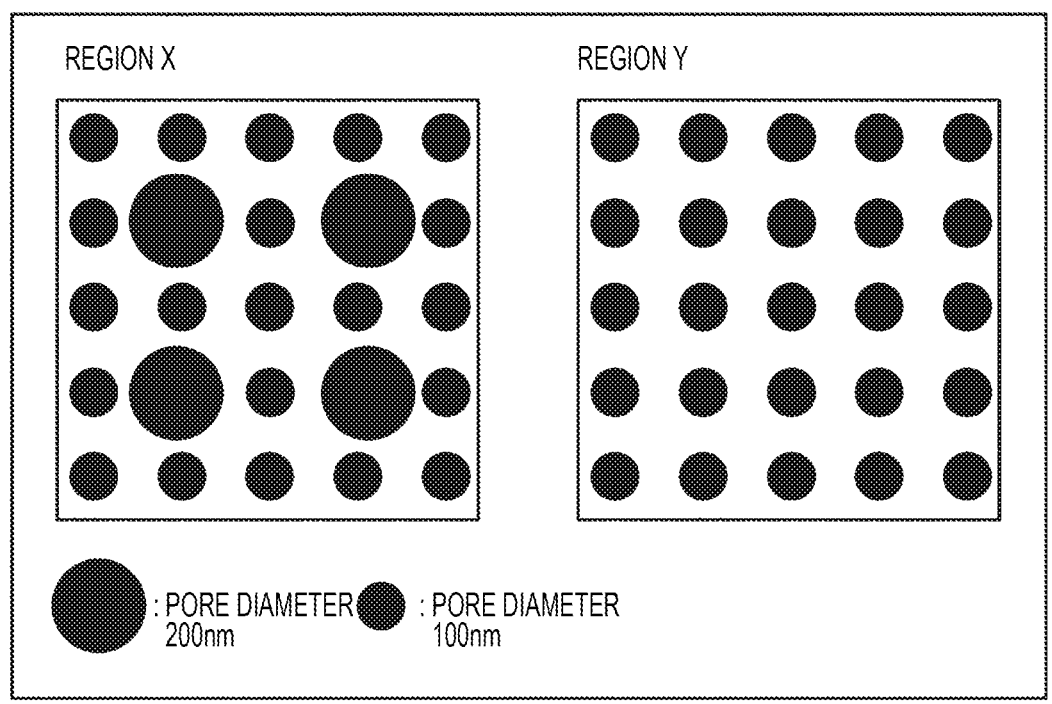
FIG. 2 is a diagram showing two regions X and Y of a certain membrane.

In general, a value of the area average pore diameter is equal to or greater than the number average pore diameter. For example, the area average pore diameter (186 nm) of the region X of a certain membrane in FIG. 2 is larger than the number average pore diameter (117 nm), whereas the area average pore diameter and the number average pore diameter of the region Y are both 100 nm. This is because since the area is proportional to the square of the pore diameter, the area ratio of relatively large pores is larger than the number ratio and the value of the area average pore diameter is easily increased. When sizes of all pores are the same as in the region Y, the area ratio and the number ratio coincide with each other. Therefore, the inventors consider that a value of area average pore diameter/number average pore diameter is an index indicating a width of the pore diameter distribution, and that the pore diameter distribution is narrower as the value of area average pore diameter/number average pore diameter is closer to 1, and that various pores having different pore diameters are present in the region as the value of area average pore diameter/number average pore diameter is larger than 1. This is similar to the concept that a value of weight average molecular weight/number average molecular weight is an index of the spread of the molecular weight distribution of the polymer. In the present specification, pores having a larger pore diameter than $D_s$ are referred to as coarse pores, and pores having a smaller pore diameter than $D_n$ are referred to as fine pores.

A number average pore diameter changing rate $\alpha_i$ is defined by the following formula.

$$\alpha_i = (D_i - D_{i+1})/D_i$$

($D_i$: Number average pore diameter of region i)

It is noted that the number average pore diameter changing rate in the region 5 is defined by the following formula.

$$\alpha_5 = (D_5 - D_4)/D_5$$

The average $L_a$ of the closest distances between the coarse pores is calculated from the analysis image binarized when calculating the pore diameter. The average $L_a$ of the closest distances between the coarse pores is, in the case where n coarse pores present in a certain region, an arithmetic average of $l_1$ to $l_n$ when the minimum values $l_1$ to $l_n$ of the distances for each of coarse pores to the remaining coarse pores are obtained. Here, the distance between the two pores is a distance of a straight line connecting area centers of the pores. The number average W of fine pores having a pore diameter smaller than the number average pore diameter, which are located at a distance smaller than $L_a$ from the center of respective coarse pores, is also calculated from the analysis image binarized when calculating the pore diameter. Therefore, the number of fine pores present inside a coarse pore Z is not included in the number of the fine pores used for the calculation of W. The number average W of the fine pores that are located at a distance smaller than $L_a$ from the center of the respective coarse pores is, in the case where n coarse pores present, an arithmetic average W of $w_1$ to $w_n$ when the number $w_1$ to $w_n$ of the fine pores that are located at a distance smaller than $L_a$ from the center of the pore is obtained for each of coarse pores.

Figure 3:
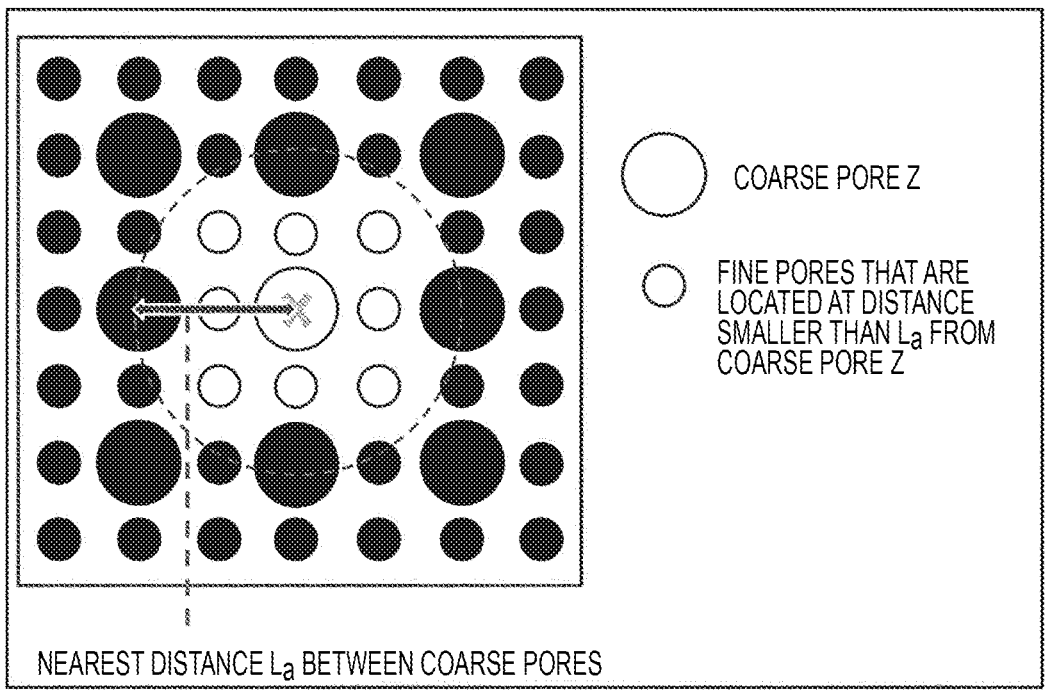
FIG. 3 is a schematic view showing a method of calculating the number of fine pores that are located at a distance smaller than $L_a$ from coarse pores.
Figure 4:
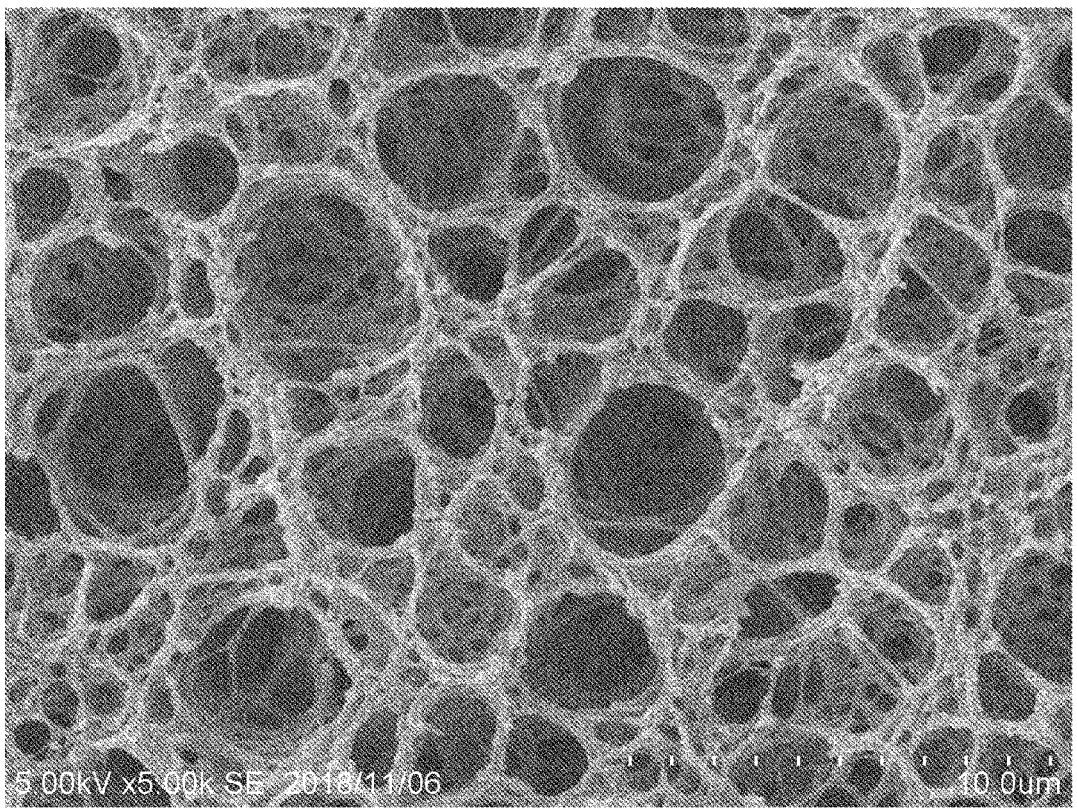
FIG. 4 is an SEM image of a center of a cross-sectional surface of Example 1.
Figure 5:
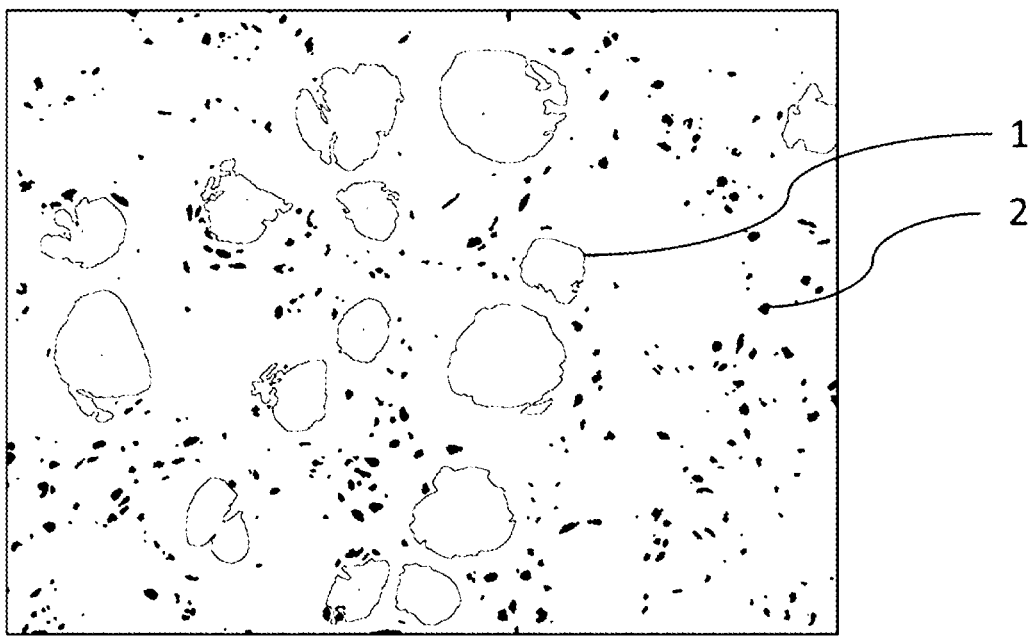
FIG. 5 is an image obtained by extracting coarse pores and fine pores from the binarized image of FIG. 4.

FIG. 3 shows an outline of a method of calculating the number of the fine pores that are located at a distance smaller than $L_a$ from the center of the coarse pore Z. The fine pores that are located at a distance smaller than $L_a$ from the coarse pore Z are included in a circle having a radius $L_a$ having the center of the coarse pore Z as a center. In the case of FIG. 3, the number of fine pores that are located at a distance smaller than $L_a$ from the center of the coarse pore Z is 8. A larger W indicates that a larger number of fine pores are present around the coarse pores. FIG. 4 is a cross-sectional SEM image of the separation membrane of the present invention. FIG. 5 is an image obtained by binarizing the SEM image by the method described above and extracting coarse pores 1 and fine pores 2. An area center of each pore is obtained as position coordinates in the image by analyzing the SEM image with an Analyze Particles command of ImageJ. By using the position coordinates, the distance of each pore can be obtained. The higher the number average W is, the more fine pores are present around the coarse pores. The present inventors have considered that the presence of a certain amount of fine pores around the coarse pores allows water-to-be-treated that permeates through the coarse pores to permeate through the fine pores, thereby achieving both permeation performance and separation performance.

In the separation membrane of the present invention, all of the regions 1 to 5 have the number average pore diameter changing rate $\alpha_i$ of −0.25 or more and 0.25 or less. The number average pore diameter changing rate represents a rate of change in the pore diameter in the thickness direction. The membrane structure has an inclined structure as the absolute value of the number average pore diameter changing rate $\alpha_i$ is larger, and has a uniform structure as the absolute value of the number average pore diameter changing rate $\alpha_i$ is smaller. When the number average pore diameter changing rate $\alpha_i$ is within the above range, good membrane strength can be exhibited. In order to exhibit high membrane strength, the regions 1 to 5 preferably have a region in which the number average pore diameter changing rate $\alpha_i$ satisfies −0.15 or more, and more preferably have a region in which the number average pore diameter changing rate $\alpha_i$ satisfies −0.10 or more. In addition, the regions 1 to 5 preferably have a region in which the number average pore diameter changing rate $\alpha_i$ satisfies 0.15 or less, and more preferably have a region in which the number average pore diameter changing rate $\alpha_i$ satisfies 0.10 or less.

In the separation membrane of the present invention, at least one of the regions 1 to 5 is the region P that satisfies the following conditions (a) and (b).

(a) Area average pore diameter $D_s$/number average pore diameter $D_n$ is 2.50 or more and 6.00 or less.

(b) When an average of closest distance between coarse pores which have a pore diameter larger than the area average pore diameter is defined as $L_a$, a number average W of the fine pores that are located at a distance smaller than $L_a$ from a center of the respective coarse pores and that have a pore diameter smaller than the number average pore diameter is 10 or more and 35 or less.

When the region P satisfies the condition (a), a large amount of coarse pores for enhancing the permeation performance are present in the region P. Meanwhile, when the region P satisfies the condition (b), a large amount of fine pores for enhancing the separation performance are present around the coarse pores in the region P. When the region P is included, both high permeation performance and separation performance can be achieved. The present inventors consider that the separation membrane having the region P allows water-to-be-treated to permeate through the coarse pores and the fine pores, so that both the permeation performance and the separation performance can be achieved. In the separation membrane of the present invention, in order to achieve both permeation performance and separation performance, it is preferable that a plurality of regions among the regions 1 to 5 are the region P, it is preferable that two or more regions among the regions 1 to 5 are the region P, it is more preferable that three or more regions among the regions 1 to 5 are the region P, it is still more preferable that four or more regions among the regions 1 to 5 are the region P, and it is particularly preferable that all of the regions 1 to 5 are the region P.

In the region P of the separation membrane of the present invention, a value of area average pore diameter $D_s$/number average pore diameter $D_n$ is 2.50 to 6.00, and more preferably 3.00 to 6.00. When the value of area average pore diameter $D_s$/number average pore diameter $D_n$ satisfies the above range, good permeation performance and separation performance are exhibited. When the value of area average pore diameter $D_s$/number average pore diameter $D_n$ is higher than the above range, water-to-be-treated may only permeate through the coarse pores, and thus the separation performance may decrease. When the value of area average pore diameter $D_s$/number average pore diameter $D_n$ is smaller than the above range, the permeation performance may decrease.

In the region P of the separation membrane of the present invention, the number average W is preferably 10 to 35, more preferably 10 to 30, still more preferably 10 to 25, and particularly preferably 10 to 20. When W satisfies the above range, good permeation performance and separation performance are exhibited. When W is larger than the above range, the permeation performance may decrease.

In the separation membrane of the present invention, in a region among the regions 1 to 5 other than the region P, the value of area average pore diameter $D_s$/number average pore diameter $D_n$ is preferably 2.00 to 20.00, more preferably 2.50 to 10.00, still more preferably 2.50 to 6.00, and particularly preferably 3.00 to 6.00. When the value of area average pore diameter $D_s$/number average pore diameter $D_n$ satisfies the above range, good permeation performance and separation performance are exhibited. When the value of area average pore diameter $D_s$/number average pore diameter $D_n$ is higher than the above range, the water-to-be-treated may permeate through only the coarse pores, and thus the separation performance may decrease. When the value of area average pore diameter $D_s$/number average pore diameter $D_n$ is smaller than the above range, the permeation performance may decrease. In order to exhibit good permeation performance and separation performance, it is preferable that there is a plurality of regions in which the value of area average pore diameter $D_s$/number average pore diameter $D_n$ is within the above range.

In the separation membrane of the present invention, in a region among the regions 1 to 5 other than the region P, the number average W is preferably 8 to 50, more preferably 10 to 40, still more preferably 10 to 35, yet still more preferably 10 to 30, particularly preferably 11 to 25, and more particularly preferably 12 to 20. When W satisfies the above range, good permeation performance and separation performance are exhibited. When W is larger than the above range, the permeation performance may decrease. Meanwhile, when W is smaller than the above range, the separation performance may decrease. In order to exhibit good permeation performance and separation performance, it is preferable that there is a plurality of regions in which the number average W is within the above preferred range.

In the separation membrane of the present invention, in all of the regions 1 to 5, the value of area average pore diameter $D_s$/number average pore diameter $D_n$ is preferably 2.00 to 20.00, more preferably 2.50 to 10.00, and still more preferably 3.00 to 6.00. When the value of area average pore diameter $D_s$/number average pore diameter $D_n$ satisfies the above range, good permeation performance and separation performance are exhibited. When the value of area average pore diameter $D_s$/number average pore diameter $D_n$ is higher than the above range, the water-to-be-treated may permeate through only the coarse pores, and thus the separation performance may decrease. When the value of area average pore diameter $D_s$/number average pore diameter $D_n$ is smaller than the above range, the permeation performance may decrease.

In the separation membrane of the present invention, an average of area average pore diameter $D_s$/number average pore diameter $D_n$ of the regions 1 to 5 is preferably 2.00 to 20.00, more preferably 2.50 to 10.00, and still more preferably 3.00 to 6.00. When the average of area average pore diameter $D_s$/number average pore diameter $D_n$ of the regions 1 to 5 satisfies the above range, good permeation performance and separation performance are exhibited. When area average pore diameter $D_s$/number average pore diameter $D_n$ is higher than the above range, the water-to-be-treated may permeate through only the coarse pores, and thus the separation performance may decrease. When area average pore diameter $D_s$/number average pore diameter $D_n$ is smaller than the above range, the permeation performance may decrease.

In the separation membrane of the present invention, the variation coefficient of the average $L_a$ of the closest distances between the coarse pores in the region P is preferably 50% to 0.1%, more preferably 40% to 0.1%, still more preferably 30% to 0.1%, yet still more preferably 28% to 0.1%, and particularly preferably 20% to 0.1%. It is considered that the variation coefficient of the average $L_a$ of the closest distances between the coarse pores represents a degree of dispersion of the coarse pores. That is, it is considered that the smaller the variation coefficient is, the more uniform the coarse pores are present in the separation membrane. When the variation coefficient of $L_a$ satisfies the above range, high separation performance can be exhibited.

In the separation membrane of the present invention, in a region among the regions 1 to 5 other than the region P, the variation coefficient of the average $L_a$ of the closest distances between the coarse pores is preferably 50% to 0.1%, more preferably 40% to 0.1%, still more preferably 30% to 0.1%, yet still more preferably 28% to 0.1%, and particularly preferably 20% to 0.1%. When the variation coefficient of $L_a$ satisfies the above range, high separation performance can be exhibited.

In the separation membrane of the present invention, in all of the regions 1 to 5, the variation coefficient of the average $L_a$ of the closest distances between the coarse pores is preferably 50% to 0.1%, more preferably 40% to 0.1%, still more preferably 30% to 0.1%, yet still more preferably 28% to 0.1%, and particularly preferably 20% to 0.1%. When the variation coefficient of $L_a$ satisfies the above range, high separation performance can be exhibited.

In the separation membrane of the present invention, the average of the variation coefficient of the average $L_a$ of the closest distances between the coarse pores of the regions 1 to 5 is preferably 50% to 0.1%, more preferably 40% to 0.1%, still more preferably 30% to 0.1%, yet still more preferably 28% to 0.1%, and particularly preferably 20% to 0.1%. When the average of the variation coefficient of $L_a$ in the regions 1 to 5 satisfies the above range, high separation performance can be exhibited.

In the separation membrane of the present invention, in all of the regions 1 to 5, the number average W is preferably 8 to 50, more preferably 10 to 40, still more preferably 10 to 35, yet still more preferably 10 to 30, particularly preferably 11 to 25, and more particularly preferably 12 to 20. When W satisfies the above range, good permeation performance and separation performance can be exhibited. When W is higher than the above range, the permeation performance may decrease. Meanwhile, when W is smaller than the above range, the separation performance may decrease.

In the separation membrane of the present invention, the average of the number average W of the regions 1 to 5 is preferably 8 to 50, more preferably 10 to 40, still more preferably 10 to 35, yet still more preferably 10 to 30, particularly preferably 11 to 25, and more particularly preferably 12 to 20. When the average of W of the regions 1 to 5 satisfies the above range, good permeation performance and separation performance are exhibited. When W is higher than the above range, the permeation performance may decrease. Meanwhile, when W is smaller than the above range, the separation performance may decrease.

In the region P of the separation membrane of the present invention, the area ratio occupied by the fine pores is preferably 3% to 20%, more preferably 5% to 13%, and still more preferably 8% to 13%. Here, the fine pores are pores having a pore diameter smaller than the number average pore diameter $D_n$. When the area ratio occupied by the fine pore is within the above range, good permeation performance and separation performance can be exhibited. When the area ratio occupied by the fine pores is higher than the above range, a liquid-to-be-treated may excessively flow into small pores, and the filtration resistance may increase. When the area ratio occupied by the fine pores is smaller than the above range, the liquid-to-be-treated may permeate through only the coarse pores, and the separation performance may decrease.

In the separation membrane of the present invention, in the region among the regions 1 to 5 other than the region P, the area ratio occupied by the fine pores is preferably 3% to 20%, more preferably 5% to 13%, and still more preferably 8% to 13%. When the area ratio occupied by the fine pore is within the above range, good permeation performance and separation performance can be exhibited. When the area ratio occupied by the fine pores is higher than the above range, a liquid-to-be-treated may excessively flow into small pores, and the filtration resistance may increase. When the area ratio occupied by the fine pores is smaller than the above range, the liquid-to-be-treated may permeate through only the coarse pores, and the separation performance may decrease. In addition, in order to exhibit good permeation performance and separation performance, it is preferable that there is a plurality of regions in which the area ratio occupied by the fine pores is within the above range.

In the separation membrane of the present invention, in all of the regions 1 to 5, the area ratio occupied by the fine pores is preferably 3% to 20%, more preferably 5% to 13%, and still more preferably 8% to 13%. When the area ratio occupied by the fine pore is within the above range, good permeation performance and separation performance can be exhibited. When the area ratio occupied by the fine pores is higher than the above range, a liquid-to-be-treated may excessively flow into small pores, and the filtration resistance may increase. When the area ratio occupied by the fine pores is smaller than the above range, the liquid-to-be-treated may permeate through only the coarse pores, and the separation performance may decrease.

In the separation membrane of the present invention, the average of the area ratios occupied by the fine pores of the regions 1 to 5 is preferably 3% to 20%, more preferably 5% to 13%, and still more preferably 8% to 13%. When the average of the area ratios occupied by the fine pores of the regions 1 to 5 is within the above range, good permeation performance and separation performance can be exhibited. When the area ratio occupied by the fine pores is higher than the above range, a liquid-to-be-treated may excessively flow into small pores, and the filtration resistance may increase. When the area ratio occupied by the fine pores is smaller than the above range, the liquid-to-be-treated may permeate through only the coarse pores, and the separation performance may decrease.

In the region P of the separation membrane of the present invention, a value of (average $L_a$ of closest distances between coarse pores–area average pore diameter $D_s$)/number average pore diameter $D_n$ is preferably 2.1 or more and 7.5 or less, more preferably 2.5 or more and 7.0 or less, still more preferably 2.5 or more and 6.5 or less, yet still more preferably 2.5 or more and 5.5 or less, and particularly preferably 3.0 or more and 5.0 or less. This value is an index of the number of fine pores between two adjacent coarse pores. When $(L_a-D_s)/D_n$ is within the above range, good permeation performance and separation performance can be exhibited. When the value is higher than the above range, a liquid-to-be-treated may excessively flow into small pores, and the filtration resistance may increase. When the value is smaller than the above range, a liquid-to-be-treated may permeate through only the coarse pores, and the separation performance may decrease.

In the separation membrane of the present invention, in the region among the regions 1 to 5 other than the region P, the value of (average $L_a$ of closest distances between coarse pores–area average pore diameter $D_s$)/number average pore diameter $D_n$ is preferably 2.1 or more and 7.5 or less, more preferably 2.5 or more and 7.0 or less, still more preferably 2.5 or more and 6.5 or less, yet still more preferably 2.5 or more and 5.5 or less, and particularly preferably 3.0 or more and 5.0 or less. When the value of $(L_a-D_s)/D_n$ is within the above range, good permeation performance and separation performance can be exhibited. When the value is higher than the above range, a liquid-to-be-treated may excessively flow into small pores, and the filtration resistance may increase. When the value is smaller than the above range, a liquid-to-be-treated may permeate through only the coarse pores, and the separation performance may decrease.

In the separation membrane of the present invention, in all of the regions 1 to 5, the value of (average $L_a$ of closest distances between coarse pores–area average pore diameter $D_s$)/number average pore diameter $D_n$ is preferably 2.1 or more and 7.5 or less, more preferably 2.5 or more and 7.0 or less, still more preferably 2.5 or more and 6.5 or less, yet still more preferably 2.5 or more and 5.5 or less, and particularly preferably 3.0 or more and 5.0 or less. When the value of $(L_a-D_s)/D_n$ is within the above range, good permeation performance and separation performance can be exhibited. When the value is higher than the above range, a liquid-to-be-treated may excessively flow into small pores, and the filtration resistance may increase. When the value is smaller than the above range, a liquid-to-be-treated may permeate through only the coarse pores, and the separation performance may decrease.

In the separation membrane of the present invention, the average of (average $L_a$ of closest distances between coarse pores–area average pore diameter $D_s$)/number average pore diameter $D_n$ of the regions 1 to 5 is preferably 2.1 or more and 7.5 or less, more preferably 2.5 or more and 7.0 or less, still more preferably 2.5 or more and 6.5 or less, yet still more preferably 2.5 or more and 5.5 or less, and particularly preferably 3.0 or more and 5.0 or less. When the average of $(L_a-D_s)/D_n$ of the regions 1 to 5 is within the above range, good permeation performance and separation performance can be exhibited. When the value is higher than the above range, a liquid-to-be-treated may excessively flow into small pores and the filtration resistance may increase. When the value is smaller than the above range, a liquid-to-be-treated may permeate through only the coarse pores, and the separation performance may decrease.

In the region P of the separation membrane of the present invention, the number average pore diameter $D_n$ is preferably 10 nm to 1000 nm, more preferably 25 nm to 800 nm, still more preferably 100 nm to 700 nm, and particularly preferably 250 nm to 600 nm. When the number average pore diameter $D_n$ is within the above range, good permeation performance and separation performance can be exhibited as a microfiltration membrane (MF membrane).

In the separation membrane of the present invention, in the region among the regions 1 to 5 other than the region P, the number average pore diameter $D_n$ is preferably 10 nm to 1000 nm, more preferably 25 nm to 800 nm, still more preferably 100 nm to 700 nm, and particularly preferably 250 nm to 600 nm. When the number average pore diameter $D_n$ is within the above range, good permeation performance and separation performance can be exhibited as the MF membrane.

In the separation membrane of the present invention, in all of the regions 1 to 5, the number average pore diameter $D_n$ is preferably 10 nm to 9000 nm, more preferably 25 nm to 800 nm, still more preferably 100 nm to 700 nm, and particularly preferably 250 nm to 600 nm. When the number average pore diameter $D_n$ is within the above range, good permeation performance and separation performance can be exhibited as the MF membrane.

In the region P of the separation membrane of the present invention, the area average pore diameter $D_s$ is preferably 20 nm to 90000 nm, more preferably 100 nm to 6000 nm, still more preferably 300 nm to 3000 nm, and particularly preferably 500 nm to 2000 nm. When the area average pore diameter $D_s$ is within the above range, good permeation performance and separation performance can be exhibited as the MF membrane.

In the separation membrane of the present invention, in the region among the regions 1 to 5 other than the region P, the area average pore diameter $D_s$ is preferably 20 nm to 90000 nm, more preferably 100 nm to 6000 nm, still more preferably 300 nm to 3000 nm, and particularly preferably 500 nm to 2000 nm. When the area average pore diameter $D_s$ is within the above range, good permeation performance and separation performance can be exhibited as the MF membrane.

In the separation membrane of the present invention, in all of the regions 1 to 5, the area average pore diameter $D_s$ is preferably 20 nm to 90000 nm, more preferably 100 nm to 6000 nm, still more preferably 300 nm to 3000 nm, and particularly preferably 500 nm to 2000 nm. When the area average pore diameter $D_s$ is within the above range, good permeation performance and separation performance can be exhibited as the MF membrane.

In the separation membrane of the present invention, in the region P, the area ratio of the pores having a pore diameter of 1600 nm to 3000 nm to all the pores is preferably 50% or more. When the area ratio is within the above range, good permeation performance and separation performance can be exhibited as the MF membrane.

In the separation membrane of the present invention, in the region P, the variation coefficient of the pores having a pore diameter of 1600 nm to 3000 nm is preferably 40% or less. When the variation coefficient is within the above range, good permeation performance and separation performance can be exhibited as the MF membrane.

In the separation membrane of the present invention, in the cross-sectional surface perpendicular to the longitudinal direction of the separation membrane, the area ratio occupied by macro voids to an entire cross-sectional area is preferably 10% to 0%, more preferably 5% to 0%, still more preferably 3% to 0%, and particularly preferably 1% to 0%. The macro void is a pore having a pore diameter of 10 µm or more. The macro voids are particularly large pores among the coarse pores, and may extremely decrease the separation performance and the membrane strength. Here, the area ratio occupied by the macro voids to the entire cross-sectional area is a proportion of the total area of the macro voids with respect to the membrane cross-sectional area included in a microscopic image of a square (membrane thickness) µm× (membrane thickness) µm with a midpoint between two membrane surfaces as the center in the cross-sectional surface perpendicular to the longitudinal direction of the separation membrane. When the area ratio occupied by the macro voids to the entire cross-sectional area is within the above range, high strength and separation performance can be exhibited. An aspect ratio of the macro voids is preferably 10 to 0.1, more preferably 5 to 0.2, and still more preferably 2 to 0.5. When the aspect ratio is within the above range, the membrane strength becomes good. Here, the aspect ratio of the macro void is a ratio of a length of the shortest straight line and a length of the longest straight line when connecting two points on the edge of the macro void.

(Surface Composition)

It is preferably that the separation membrane of the present invention contains a hydrophilic polymer other than the main component A, and an element ratio of the hydrophilic polymer to the main component A is 15 atomic % or more in the surface composition calculated by X-ray photoelectron analysis (ESCA) measurement. The hydrophilic polymer other than the main component A is, for example, a hydrophilic polymer used as the subcomponent B or the subcomponent C described above. When the element ratio is within the above range, fouling during the filtration operation can be prevented. From the viewpoint of the membrane strength, the element ratio of the hydrophilic polymer to the main component in a surface concentration calculated by ESCA measurement is preferably 99 atomic % or less. It is noted that, in order to calculate the surface concentration of the hydrophilic polymer by ESCA measurement, the hydrophilic polymer needs to contain an element that is not contained in the main component.

(Production Method)

In the present invention, a method for producing the separation membrane containing, as the main component A, a cellulose ester includes the following steps (1) to (3).

(1) A resin composition preparing step of melt-kneading 15 wt % or more and 40 wt % or less of cellulose ester, 40 wt % or more and 84 wt % or less of subcomponent B having a number average molecular weight of 200 or more and being compatible with the main component, and 1 wt % or more and 20 wt % or less of subcomponent C being incompatible with the main component to prepare a resin composition.

(2) A forming step of forming the resin composition by discharging the resin composition from a discharging mouthpiece to prepare a resin formed product in which each component is uniformly dispersed (compatibilized).

(3) An immersion step of immersing the resin formed product in a solvent θ having a solubility parameter distance with respect to the main component in a range of 10 or more and 25 or less.

In the present invention, the method for producing the separation membrane containing, as the main component A, a polyamide includes the following steps (1) to (3).

(1) A resin composition preparing step of melt-kneading 15 wt % or more and 40 wt % or less of polyamide, 40 wt % or more and 84 wt % or less of subcomponent B having a number average molecular weight of 200 or more and being compatible with the main component, and 1 wt % or more and 20 wt % or less of subcomponent C being incompatible with the main component to prepare a resin composition.

(2) A forming step of forming the resin composition by discharging the resin composition from a discharging mouthpiece to prepare a resin formed product in which each component is uniformly dispersed (compatibilized).

(3) An immersion step of immersing the resin formed product in a solvent having δh of a Hansen solubility parameter of 10 or more.

The proportion of the main component A in the resin composition prepared in the preparing step needs to be 15 mass % to 40 mass %, and is more preferably 15 mass % to 35 mass %, still more preferably 20 mass % to 35 mass %, and particularly preferably 20 mass % to 30 mass %. When the proportion of the main component A is within the above range, a membrane having good permeation performance can be obtained while exhibiting good processability in the forming step. Meanwhile, when the proportion of the main component A is too high, it is difficult to obtain a resin formed product in which each component is uniformly dispersed.

The proportion of the subcomponent B in the resin composition prepared in the above preparing step needs to be 40 mass % to 84 mass %. The proportion of the subcomponent B is preferably 45 mass % to 80 mass %, and more preferably 50 mass % to 75 mass %. When the proportion of the subcomponent B is within this range, good processability is easily exhibited in the forming step. When the proportion of the subcomponent B is within this range, even in a situation where the main component A and the subcomponent C are contained, a uniform resin formed product can be obtained, and a separation membrane having good permeation performance and separation performance can be obtained.

The proportion of the subcomponent C in the resin composition prepared in the above preparing step needs to be 1 mass % to 20 mass %. The proportion of the subcomponent C is preferably 1 mass % to 15 mass %, and more preferably 1 mass % to 10 mass %. When the proportion of the subcomponent C is within this range, good processability is easily exhibited in the forming step. Meanwhile, when the proportion of the subcomponent C is too high, it is difficult to obtain a resin formed product in which each component is uniformly dispersed. In addition, processability in the forming step is also deteriorated.

The proportion of the compound having a number average molecular weight of 1000 or less and 200 or more in the resin composition prepared in the above preparing step is preferably 20 mass % to 0.01 mass %, and more preferably 10 mass % to 0.05 mass %. When the proportion of the compound having a number average molecular weight of 1000 or less and 200 or more is within this range, good processability is easily exhibited in the forming step.

The proportion of the compound having a weight average molecular weight of 10000 or more in the resin composition prepared in the above preparing step is preferably 99 mass % to 50 mass %, more preferably 99 mass % to 55 mass %, still more preferably 99 mass % to 75 mass %, and particularly preferably 99 mass % to 80 mass %. When the proportion of the compound having a weight average molecular weight of 10000 or more is within this range, good processability is easily exhibited in the forming step.

Next, the method for producing the separation membrane of the present invention will be specifically described by taking a case where the separation membrane is a hollow-fiber membrane having a hollow fiber shape as an example.

The resin composition preparing step is a step of preparing a resin composition by melt-kneading the main component A in an amount of 15 wt % or more and 40 wt % or less, the subcomponent B having a number average molecular weight of 200 or more and being compatible with the main component in an amount of 40 wt % or more and 84 wt % or less, and the sub-component C being incompatible with the main component in an amount of 1 wt % or more and 20 wt % or less. The resin composition may contain the additive described above as necessary.

In order for the obtained separation membrane to exhibit good permeation performance and separation performance, the resin composition obtained in the resin composition preparing step is preferably uniform. Here, "uniform" means that the resin composition does not have an island component of 100 nm or more. The presence or absence of the island component can be confirmed by observing the cross section of the resin composition with a transmission electron microscope or an atomic force microscope.

In order to make the resin composition uniform, it is necessary to appropriately adjust the types and contents of the components of the resin composition, or to prolong a kneading time or increasing the kneading strength at the time of kneading. In the case where the main component is a cellulose ester, for example, when polyethylene glycol having a number average molecular weight of more than 8000 is contained in an amount of more than 5 wt % as the subcomponent C, it is likely to be difficult to make each component of the resin composition uniform. Therefore, when polyethylene glycol having a number average molecular weight of more than 8000 is used as the subcomponent C, the content of the subcomponent C in the resin composition is preferably 5 wt % or less, more preferably 2.5 wt % or less, and still more preferably 2 wt % or less. When polyethylene glycol having a number average molecular weight of more than 3000 is used as the subcomponent C, the content of the subcomponent C in the resin composition is preferably 15 wt % or less, and more preferably 10 wt % or less.

Examples of a device for melt-kneading include a kneader, a roll mill, a Banbury mixer, and a mixer such as a single-screw or twin-screw extruder. Among them, a twin-screw extruder is preferable as the device for melt-kneading in order to improve dispersibility of a structure-forming agent, and a twin-screw extruder with vent holes is more preferable in order to remove water and volatile substances such as low molecular weight substances. In order to make the resin composition uniform, a screw shape of the twin-screw extruder preferably has a kneader portion.

In order to make the resin composition uniform, it is preferable to melt-knead the resin composition obtained in the resin composition preparing step again.

In order to make the resin composition uniform, it is preferable that one of the main component A, the subcomponent B, and the subcomponent C, which are solid, is in a powder form, and it is more preferable that all of the main component A, the subcomponent B, and the subcomponent C are in a powder form. Here, the powder refers to a raw material passing through a 35-mesh wire mesh.

In order to obtain a uniform resin composition, it is preferable that the obtained resin composition is pelletized once, melted again, and then subjected to a forming step. In the case where the resin composition is once pelletized, it is preferable that pellets are dried to adjust a moisture content to 200 ppm (on a mass basis) or less, and then subjected to the forming step. In addition, in the forming step, it is preferable to use a resin composition in which each component is uniform.

In the resin composition preparing step, the number of times of melt-kneading is preferably 2 times or more and 5 times or less, and more preferably 3 times or more and 5 times or less. When the number of times of melt-kneading is within the above range, a uniform resin composition can be obtained while preventing deterioration of the resin. Here, the number of times of melt-kneading is the number of times the raw materials are once melted and kneaded by a screw. For example, in the case where the raw materials are melt-kneaded to be once pelletized, the obtained pellets are melted again, kneaded through a screw, and discharged from a mouthpiece to perform forming, the number of times of the melt-kneading is 2. In the case where the raw materials are melt-kneaded to be once pelletized, the pellets are melt-kneaded again to obtain pellets, the pellets are again melted and kneaded through a screw, and discharged from a mouthpiece to perform forming, the number of times of the melt-kneading is 3.

The forming step is a step of discharging the resin composition obtained in the resin composition preparing step into air from a discharging mouthpiece having a double-annular nozzle in which a gas flow path is disposed in a central portion, and cooling the resin composition by a cooling device to form a resin formed product (resin formed body) in which the respective components are uniformly mixed. When each component in the resin formed body is uniform, the obtained separation membrane exhibits good permeation performance and separation performance. In the present invention, it is important that each component in the resin formed body is uniform. In general, when two components being incompatible with each other, such as the relationship between the main component A and the sub-component C, are present in a mixture, the two components repel each other, and the obtained resin composition and formed product are likely to be non-uniform. In the present invention, the resin composition contains three or more components of the main component A, the subcomponent B, and the subcomponent C, and each of the components has a specific concentration, so that the resin formed product is likely to be uniform.

The method for producing the separation membrane containing, as a main component, a cellulose ester preferably includes a step (heat treatment step) of heat-treating the resin formed body in order to exhibit good permeation performance of the separation membrane. The reason why good permeation performance is exhibited by the heat treatment is presumed to be that an orientation of the main component A in the resin formed body is relaxed by the heat treatment. The resin formed body may be subjected to the heat treatment step after being once wound and wound off again, or may be directly subjected to the heat treatment step. Examples of the method of the heat treatment include a method in which the temperature of the resin formed product before the heat treatment is increased to a temperature at which the heat treatment is performed while the resin formed product is transported on a heating roll, and a method in which the temperature of the resin formed body before the heat treatment is increased to a temperature at which the heat treatment is performed while the resin formed body is transported in a dry heat oven or a heated liquid such as hot water or solvent.

The temperature at which the resin formed body is heat-treated is preferably Tmax−30° C. to Tmax+30° C. where the temperature at which the thermal shrinkage stress is maximized is designated as Tmax. A relaxation ratio during the heat treatment is preferably 0.5% to 10.0%, and more preferably 1.0% to 5.0%. When the temperature and the relaxation ratio during the heat treatment of the resin formed body are within the above ranges, respectively, the orientation of the main component A in the resin formed body can be relaxed.

In the method for producing the separation membrane containing, as a main component, a cellulose ester, the immersion step is a step of immersing the resin formed body in a solvent θ having a solubility parameter distance (Ra) with respect to the main component A in a range of 10 to 25. At this time, by using a solvent or a mixed solvent having an appropriate affinity with the main component A, it is possible to prevent extreme swelling or plasticization of the resin. Therefore, the solvent permeates into the resin formed product while maintaining the shape of the resin. At this time, it is presumed that a plasticizer and a pore forming agent are eluted while phase separation occurs in the resin formed product. The longer the immersion time of the solvent or the higher the temperature is, the larger the porosity and the pore size are, and the lower the membrane strength is. In the present invention, it is important to select a solvent from the viewpoint of obtaining the above-described separation membrane. The solvent is preferably a solvent having a certain degree of affinity with the main component A. The affinity between the main component A and the solvent can be estimated by a three-dimensional Hansen solubility parameter (Non-Patent Literature 1). Specifically, the smaller the solubility parameter distance (Ra) in the following formula (4) is, the higher the affinity of the solvent to the main component A is.

[Math 4]

$$Ra = \sqrt{4(\delta_{Ad} - \delta_{Bd})^2 + (\delta_{Ap} - \delta_{Bp})^2 + (\delta_{Ah} - \delta_{Bh})^2} \quad \text{Formula (4)}$$

Here, $\delta_{Ad}$, $\delta_{Ap}$, and $\delta_{Ah}$ are a dispersion term, a polar term, and a hydrogen bond term of the solubility parameter of the main component A, and $\delta_{Bd}$, $\delta_{Bp}$, and $\delta_{Bh}$ are a dispersion term, a polar term, and a hydrogen bond term of the solubility parameter of the solvent or the mixed solvent.

The solubility parameter (δ Mixture) of the mixed solvent can be determined by the following formula (5).

[Math 5]

$$\delta_{Mixture} = \Sigma \varphi_i \delta_i \quad \text{Formula (5)}$$

Here, $\varphi_i$ and $\delta_i$ are a volume fraction and a solubility parameter of the component i, and hold for each of the dispersion term, the polarity term, and the hydrogen bond term. Here, the "volume fraction of the component i" refers to a ratio of the volume of the component i before mixing to the sum of the volumes of all the components before mixing. For the three-dimensional Hansen solubility parameter of the solvent, a value described in Non-Patent Literature 1 is used. For the solvent parameter not described, a value contained in software "Hansen solubility parameter in practice" developed by Charles Hansen et al. is used. The three-dimensional Hansen solubility parameter of the solvent or polymer not described in the above software can be calculated by a Hansen sphere method using the above software.

In the method for producing a separation membrane containing, as a main component, a cellulose ester, the solvent θ used in the immersion step is preferably a mixed solvent of a good solvent and a non-solvent for the main component A. Here, the good solvent for the main component A refers to a solvent in which the value of Ra with respect to the main component A is 12 or less. The non-solvent for the main component A refers to a solvent in which the value of Ra with respect to the main component A is greater than 12. When the solvent θ is a mixed solvent of a good solvent and a non-solvent, plasticization and phase separation of the main component A are compatible, and a uniform structure is formed. As the good solvent, a solvent having Ra of 4 or more is preferable in order to prevent excessive plasticization of the main component A. When the main component A is a cellulose ester, examples of the solvent having Ra of 4 or more include an organic solvent. Specific examples thereof include γ-butyrolactone, acetone, acetonitrile, 1,4-dioxane, methyl acetate, and tetrahydrofuran. From the viewpoint of inflammability, γ-butyrolactone is particularly preferred. As the non-solvent, water is preferable because water is inexpensive.

In the method for producing a separation membrane containing, as a main component, a polyamide, the immersion step is an immersion step of immersing the resin formed product in a solvent having $δ_h$ of a Hansen solubility parameter of 10 or more. In order to enhance the permeation performance of the separation membrane, the $δ_h$ of Hansen solubility parameter of the solvent to be used is preferably 12 or more, and more preferably 15 or more. When $δ_h$ is within the above range, the resin is plasticized and imparted with mobility, while extreme swelling and plasticization of the resin can be prevented. Therefore, the solvent permeates into the resin composition while the shape of the resin is maintained. At this time, it is presumed that the plasticizer and the pore forming agent are eluted while the phase separation of the resin composition occurs. The longer the immersion time of the solvent or the higher the temperature is, the larger the porosity and the pore size are, and the lower the membrane strength is. In the present invention, from the viewpoint of obtaining the above-described separation membrane, it is important to select a solvent.

In the method for producing a separation membrane containing, as a main component, a polyamide, the solvent θ to be used in the immersion step may be one kind of solvent or a mixed solvent of a plurality of solvents. When one kind of solvent is used, the solvent θ is preferably propylene glycol, methanol, isopropanol, or ethanol. When a mixed solvent of a plurality of solvents is used, the solvent θ is preferably a mixed solvent of an organic solvent and water, and more preferably a mixed solvent of water and an organic solvent selected from DMF, NMP, triethylene glycol, triacetin, sulfolane, DMSO, and isopropanol.

In order to obtain the separation membrane, it is very important that the resin formed product contains 15 wt % or more and 40 wt % or less of the main component A, 40 wt % or more and 84 wt % or less of the subcomponent B being compatible with the main component, and 1 wt % or more and 20 wt % or less of the subcomponent C being incompatible with the main component, and each component of the resin formed body is uniform. It is presumed that when the subcomponents B and C having different compatibility with the main component A are contained, coarse pores are formed, and the respective components of the resin formed body are uniform, so that a structure in which fine pores coexist around the coarse pores is obtained, and a membrane exhibiting the effect of the present invention is obtained.

EXAMPLE

Hereinafter, the present invention will be described in more detail with reference to Examples, but the present invention is not limited thereto.

[Measurement and Evaluation Method]

(1) Weight Average Molecular Weight (Mw) of Main Component A, Subcomponent B, and Subcomponent C A main component A, a subcomponent B and a subcomponent C were completely dissolved in tetrahydrofuran or another solvent so as to have a concentration of 0.15 mass %, and the mixture was used as a sample for GPC measurement. The sample was subjected to GPC measurement with Waters 2690 under the following conditions to determine a weight average molecular weight (Mw) in terms of polystyrene.

Column: Two TSK-gel GMHHR-H (manufactured by Tosoh Corporation) were connected
Detector: Waters 2410, differential refractometer RI
Flow rate: 1.0 mL/min
Injection amount: 200 μL (2) Observation of Cross-section of Separation Membrane in Thickness Direction and Pore Diameter Measurement After a separation membrane was frozen with liquid nitrogen, the separation membrane was cleaved by applying a stress (using a razor or microtome as appropriate) so that a cross-sectional surface in the thickness direction (cross-sectional surface perpendicular to a longitudinal direction) of the separation membrane was exposed. The exposed cross-sectional surface of the separation membrane was observed using a scanning electron microscope (SU1510 manufactured by Hitachi High-Technologies Corporation) at a resolution of 20 nm/pixel and a magnification of 5000 times, and an image was continuously obtained from one surface to the other surface. A luminance and contrast were adjusted by an automatic function. The observation conditions are as follows.

(Sputtering)
Device: manufactured by Hitachi High-Technologies Corporation (E-1010)
Deposition time: 40 seconds
Current value: 20 mA
(SEM)
Device: manufactured by Hitachi High-Technologies Corporation (SU1510)
Acceleration voltage: 5 kV
Probe current: 30

In the case of a hollow-fiber membrane, regions 1 to 5 obtained by dividing at an equal interval in order in a membrane thickness direction of the separation membrane from three locations on the outer surface of the separation membrane were set. As for $D_s$, $D_n$, and W in each region, an arithmetic average of three points was used. In the case of a flat membrane, regions 1 to 5 obtained by dividing at an equal interval in order in the membrane thickness direction of the separation membrane from three locations on one surface were set. As for $D_s$, $D_n$, and W in each region, an arithmetic average of three points was used. A cross-sectional image when calculating an area ratio occupied by macro voids to an entire cross-sectional area was observed using a scanning electron microscope (SU1510 manufactured by Hitachi High-Technologies Corporation) at a resolution of 20 nm/pixel and a magnification of 1000 times.

(3) Thickness of Separation Membrane (μm)

The cross-sectional surface in the thickness direction of the separation membrane of above (2) was observed and photographed by an optical microscope, and the thickness of the separation membrane was calculated. More specifically, the thicknesses of 10 randomly selected locations were measured, and an arithmetic average thereof was defined as a thickness of the separation membrane.

(4) Outer Diameter and Inner Diameter (μm) of Hollow-Fiber Membrane

The cross-sectional surface in the thickness direction of the separation membrane of the above (2) was observed and photographed by an optical microscope, and an outer diameter OD and an inner diameter ID of the hollow-fiber membrane were calculated. More specifically, the outer diameter and the inner diameter of 10 randomly selected locations were measured, and the arithmetic averages thereof were defined as an outer diameter $R_1$ and an inner diameter $R_2$ of the hollow-fiber membrane, respectively.

(5) Ratio (wt %) of Subcomponent B to Main Component A

Several kinds of standard samples in which the main component A and the subcomponent were mixed at arbitrary ratio were prepared, IR measurement was performed on each of the standard samples, and a calibration curve for a peak intensity ratio representing each of the main component A and the subcomponent in the obtained spectrum was prepared. Thereafter, IR measurement was also performed on the separation membrane, and a weight ratio of the main component A of the separation membrane was determined based on the prepared calibration curve.

(6) Surface Concentration (Atomic %) of Hydrophilic Polymer

A surface concentration of a hydrophilic polymer contained in the separation membrane other than the main component A was determined by X-ray photoelectron analysis (ESCA) measurement. Specific measurement conditions were as follows.

Device: X-ray photoelectron analyzer (ESCALAB 220iXL)

Excitation X-ray: monochromatic Al K$a_{1,2}$ ray (1486.6 eV)

X-ray diameter: 1 mm

Photoelectron escape angle: 90°

ESCA measurement was performed on each of the main component A and the hydrophilic polymer other than the main component A, and an element ratio of the main component A and the hydrophilic polymer was determined from a 1 s peak of each element in the obtained spectrum. Thereafter, ESCA measurement was performed on the separation membrane, and the element ratio of the hydrophilic polymer in the separation membrane was determined based on the is peak of each element in the obtained spectrum. In order to calculate the surface concentration of the hydrophilic polymer by ESCA measurement, the subcomponent must contain an element that is not contained in the main component. When the main component is a cellulose ester and the subcomponent is a copolymer of fatty acid vinyl and vinylpyrrolidone, the surface concentration can be calculated because only the copolymer of fatty acid vinyl and vinylpyrrolidone contains N element. At this time, the element ratio of the copolymer of fatty acid vinyl and vinylpyrrolidone in the separation membrane was calculated based on the following formula.

(Element ratio of copolymer of fatty acid vinyl and vinylpyrrolidone in separation membrane)=100×{(carbon element ratio in single copolymer of fatty acid vinyl and vinylpyrrolidone)+(oxygen element ratio in single copolymer of fatty acid vinyl and vinylpyrrolidone)+(nitrogen element ratio in single copolymer of fatty acid vinyl and vinylpyrrolidone)}×(nitrogen element ratio in separation membrane)/(nitrogen element ratio in single copolymer of fatty acid vinyl and vinylpyrrolidone) (atomic %)

(7) Porosity (%)

After a fiber length L (cm) of the hollow-fiber membrane was measured, a mass M (g) of the hollow-fiber membrane dried in vacuum at 25° C. for 8 hours was measured. A density pi of the hollow-fiber membrane was calculated by the following formula (6) using the values of the outer diameter OD (μm) and the inner diameter ID (μm) measured in the above (4).

[Math 6]

$$\rho_1 = M/[\pi \times [(OD/2)^2 - (ID/2)^2] \times L]$$  Formula (6)

The porosity ε(%) was calculated based on the following formula (7).

[Math 7]

$$\varepsilon = (1 - \rho_1/\rho_2) \times 100$$  Formula (7)

Here, $\rho_2$ is the density of the main component A.

(8) Membrane Permeation Flux (m³/m²/h)

A small module having an effective length of 50 mm and composed of a separation membrane having a hollow shape, that is, a single hollow-fiber membrane was produced. Distilled water was fed to this small module for 30 minutes under the conditions of a temperature of 25° C. and a filtration differential pressure of 16 kPa, and an amount (m³) of the obtained permeated water was measured. The amount of permeated water was converted into a value per unit time (h) and per unit membrane area (m²), which was further converted in terms of a pressure (50 kPa) to obtain the permeation performance of pure water (membrane permeation flux) (unit=m³/m²/h).

(9) Latex Rejection Ratio (%)

As the fractionation performance of the hollow-fiber membrane, a rejection ratio of polystyrene latex (Pst) particles having a diameter of 83 nm was measured. As the Pst particles having a diameter of 83 nm, product manufactured by Seradyn Corporation was used. A 20 ppm (on a mass basis) suspension of the Pst particles was prepared, and cross-flow circulation (flow rate: 0.7 L/min) was performed under the condition of a filtration pressure difference of 16 kPa to perform filtration. Permeated water was sampled using a glass sample bottle. A first 5 mL of water was discarded, and 5 mL of water was sampled two times to obtain a total of 10 mL of permeated water. A particle concentration was measured from an absorbance of raw water and permeated water at a wavelength of 222 nm, and the rejection ratio was calculated. For a flat membrane, a circular sample having a diameter of 43 mm was placed in a filtration holder (UHP-43, manufactured by Advantec Co., Ltd.) and a first 2.5 mL of water was discarded, and 2.5 mL of permeated water was sampled two times to obtain a total of 5.0 mL of permeated water. Next, a permeation amount of the polystyrene latex was determined from the absorbance measurement, and the latex particle rejection ratio of the membrane was calculated from the permeation amount.

(10) Membrane Lifetime (mL)

For a separation membrane having a hollow shape, that is, a hollow-fiber membrane, a nonwoven fabric filter was used, water of Lake Biwa which was pre-treated with activated carbon was used as a liquid-to-be-treated, and a flow amount (mL) until a value of Fe/Fs became 0.1 or less was defined as a membrane lifetime, where Fs was a membrane permeation flux measured in the same manner as in the above (8) except for a condition of a pressure of 50 kPa.

(11) Strength at Break (MPa)

Under an environment of a temperature of 20° C. and a humidity of 65%, the tensile strength of the separation membrane in a long axis direction was measured using a tensile tester (Tensilon UCT-100 manufactured by Orientec Co., Ltd.). Specifically, measurement was performed under the conditions of a sample length of 100 mm and a tensile speed of 100 mm/min, and the strength at break (tensile strength) (MPa) was calculated from the tensile strength. The number of times of measurements was 5 times, and the strength at break (MPa) was an average value thereof.

Hereinafter, each component in the resin composition will be described.

[Main Component A]

(A1) Cellulose ester: cellulose acetate propionate (average degree of substitution of acetyl group: 0.2, average degree of substitution of propionyl group: 2.5, weight average molecular weight (Mw): 185000)

(A2) Cellulose ester:

To 100 parts by mass of cellulose (cotton linter), 240 parts by mass of acetic acid and 67 parts by mass of propionic acid were added, followed by mixing at 50° C. for 30 minutes. After the mixture was cooled to room temperature, 172 parts by mass of acetic anhydride and 168 parts by mass of propionic anhydride, which were cooled in an ice bath, were added as an esterifying agent, and 4 parts by mass of sulfuric acid was added as an esterifying catalyst, followed by stirring for 150 minutes to perform an esterification reaction. In the esterification reaction, when the temperature exceeded 40° C., the mixture was cooled in a water bath.

After the reaction, a mixed solution of 100 parts by mass of acetic acid and 33 parts by mass of water as a reaction terminator was added over 20 minutes to hydrolyze excess anhydride. Thereafter, 333 parts by mass of acetic acid and 100 parts by mass of water were added, followed by heating and stirring at 80° C. for 1 hour. After the completion of the reaction, an aqueous solution containing 6 parts by mass of sodium carbonate was added, and the precipitated cellulose acetate propionate was separated by filtration, subsequently washed with water, and then dried at 60° C. for 4 hours. The obtained cellulose acetate propionate had an average degree of substitution of the acetyl group and propionyl group of 1.9 and 0.7, respectively, and a weight average molecular weight (Mw) of 178000.

(A3) Nylon 6 (Amilan CM1021 (Toray Industries, Inc.) viscosity number: 179 mL/g)

[Subcomponent B]

(B1) Polyethylene glycol, number average molecular weight (Mn): 600 (PEG 600 (Sanyo Chemical Industries, Ltd.)

(B2) Copolymer of PVP and vinyl acetate (Kollidon VA64 (BASF Japan Ltd.) Mn: 4500 Mw: 17000)

(B3) PVP (Luviskol K17 (manufactured by BASF Japan Ltd.) Mn: 2000 Mw: 9000)

[Subcomponent C]

(C1) Polyethylene glycol, number average molecular weight (Mn): 3400 flake-shaped (PEG4000S (Sanyo Chemical Industries, Ltd.))

(C2) Polyethylene glycol, number average molecular weight (Mn): 8600 powder (PEG6000P (Sanyo Chemical Industries, Ltd.))

(C3) Polyethylene glycol, number average molecular weight (Mn): 10000 flake-shaped (PEG10000 (Sanyo Chemical Industries, Ltd.))

(C4) Polyethylene glycol, number average molecular weight (Mn): 1000 waxy (PEG1000 (Sanyo Chemical Industries, Ltd.))

[Antioxidant D]

(D1) Bis(2,6-di-t-butyl-4-methylphenyl)pentaerythritol diphosphite

Example 1

The main component A1 (25.0 mass %), the subcomponent B1 (5.0 mass %), the subcomponent B2 (60.0 mass %), the subcomponent C1 (9.9 mass %), and the antioxidant D1 (0.1 mass %) were melt-kneaded at 220° C. in a twin-screw extruder, homogenized, and then pelletized to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 190° C., and discharged downward from an outer annular portion of a discharging mouthpiece having one mouthpiece hole (c) under the condition of a discharging amount of 25 g/min to form a resin formed product (forming step). The obtained resin formed product (resin formed body) was observed with an atomic force microscope. When the resin composition did not have an island component of 100 nm or more, the resin formed product was evaluated as "uniformly dispersed". When the resin composition had an island component of 100 nm or more, the resin formed product was evaluated as "non-uniform".

Figure 8:
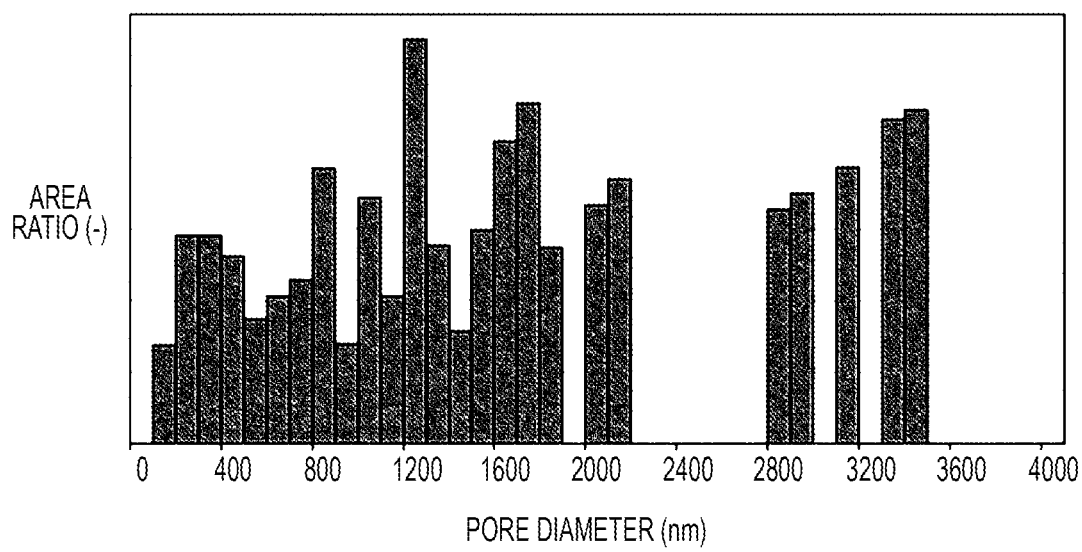
FIG. 8 is a histogram of an area ratio to a pore diameter in a region 3 of Example 1.

The resin formed product, that is, the hollow fiber was guided to a cooling device, cooled by cooling air at 25° C. and a wind speed of 1.5 m/sec, and wound with a winder at a winding speed of 190 m/min. The resin formed body was fixed at both ends at a relaxation rate of 4.0%, allowed to stand in a hot air oven at 120° C. for 20 minutes, then immersed in an elution bath (65 mass % γ-butyrolactone (GBL) aqueous solution; Ra=16) at 40° C. for 20 minutes (immersion step), and further immersed in distilled water for 10 minutes for washing to obtain a separation membrane. FIG. 8 is a histogram of an area ratio to a pore diameter in the region 3 of Example 1. The pore diameter distribution is wide, and at the same time, area average pore diameter $D_s$/number average pore diameter $D_n$ is high.

Example 2

The main component A1 (25.0 mass %), the subcomponent B1 (5.0 mass %), the subcomponent B2 (60.0 mass %), the subcomponent C1 (9.9 mass %), and the antioxidant D1 0.1 mass % were melt-kneaded at 220° C. in a twin-screw extruder, homogenized, and then pelletized to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 190° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was fixed at both ends at a relaxation rate of 2.0%, allowed to stand in a hot air oven at 120° C. for 20 minutes, then immersed in an elution bath (65 mass % GBL aqueous solution; D=16) at 40° C. for 20 minutes (immersion step), and further immersed in distilled water for 10 minutes for washing to obtain a separation membrane.

Example 3

The main component A1 (25.0 mass %), the subcomponent B1 (5.0 mass %), the subcomponent B2 (60.0 mass %), the subcomponent C1 (9.9 mass %), and the antioxidant D1 (0.1 mass %) were melt-kneaded at 220° C. in a twin-screw extruder, homogenized, and then pelletized (preparing step). The resin composition was melt-kneaded again at 220° C., homogenized, and then pelletized to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 190° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (65 mass % GBL aqueous solution; Ra=16) at 40° C. for 20 minutes (immersion step), and further immersed in distilled water for 10 minutes for washing to obtain a separation membrane.

Example 4

The main component A1 (25.0 mass %), the subcomponent B1 (5.0 mass %), the subcomponent B2 (55.0 mass %), the subcomponent C1 (14.9 mass %), and the antioxidant D1 (0.1 mass %) were melt-kneaded at 220° C. in a twin-screw extruder, homogenized, and then pelletized to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 190° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was fixed at both ends at a relaxation rate of 2.0%, allowed to stand in a hot air oven at 110° C. for 20 minutes, then immersed in an elution bath (65 mass % GBL aqueous solution; Ra=16) at 40° C. for 20 minutes (immersion step), and further immersed in distilled water for 10 minutes for washing to obtain a separation membrane.

Example 5

The main component A1 (25.0 mass %), the subcomponent B1 (5.0 mass %), the subcomponent B2 (68.5 mass %), the subcomponent C2 (1.4 mass %), and the antioxidant D1 (0.1 mass %) were melt-kneaded at 220° C. in a twin-screw extruder, homogenized, and then pelletized to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 210° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was fixed at both ends at a relaxation rate of 2.0%, allowed to stand in a hot air oven at 120° C. for 20 minutes, then immersed in an elution bath (65 mass % GBL aqueous solution; Ra=16) at 40° C. for 20 minutes (immersion step), and further immersed in distilled water for 10 minutes for washing to obtain a separation membrane.

Example 6

The main component A3 (30.0 mass %), the subcomponent B3 (60.0 mass %), and the subcomponent C4 (10 mass %) were melt-kneaded at 250° C. in a twin-screw extruder and pelletized to prepare a resin composition (preparing step). The resin composition was vacuum-dried at 80° C. for 8 hours. The resin composition was melt-kneaded again at 250° C., homogenized, and then pelletized to prepare a resin composition for melt spinning (preparing step). The resin composition was vacuum-dried at 80° C. for 8 hours.

The dried resin composition was further melt-kneaded at 250° C. in the twin-screw extruder, then introduced into a melt spinning pack at a spinning temperature of 230° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (water) at 25° C. for 1 hour (immersion step) to obtain a separation membrane.

Example 7

The main component A3 (30.0 mass %), the subcomponent B3 (55.0 mass %), and the subcomponent C4 (15 mass %) were melt-kneaded at 250° C. in a twin-screw extruder and pelletized to prepare a resin composition (preparing step). The resin composition was vacuum-dried at 80° C. for 8 hours. The resin composition was melt-kneaded again at 250° C., homogenized, and then pelletized to prepare a resin composition for melt spinning (preparing step). The resin composition was vacuum-dried at 80° C. for 8 hours.

The dried resin composition was further melt-kneaded at 250° C. in the twin-screw extruder, then introduced into a melt spinning pack at a spinning temperature of 230° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (water) at 25° C. for 1 hour (immersion step) to obtain a separation membrane.

Comparative Example 1

A separation membrane was obtained in the same manner as in Example 3 except that an elution bath used in an immersion step was changed to water (Ra=39). When a cross-sectional structure was observed with SEM, no porous structure was observed, and a membrane permeation flux was 0.1 or less.

Comparative Example 2

A membrane was formed in the same manner as in Example 3 except that an elution bath used in an immersion step was changed to a 90 mass % GBL aqueous solution (Ra=8). A membrane shape was not maintained in the immersion step.

Comparative Example 3

The main component A1 (25.0 mass %), the subcomponent B1 (5.0 mass %), the subcomponent B2 (69.9 mass %), and the antioxidant D1 (0.1 mass %) were melt-kneaded at 220° C. in a twin-screw extruder, homogenized, and pelletized to prepare a resin composition for melt spinning (preparing step). The resin composition was vacuum-dried at 80° C. for 8 hours.

Figure 9:
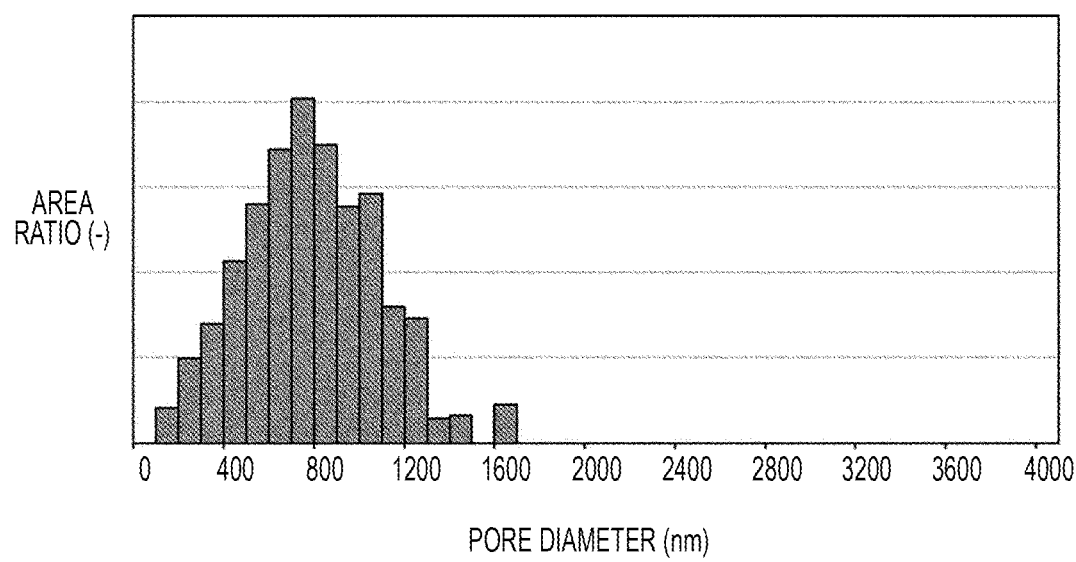
FIG. 9 is a histogram of an area ratio to a pore diameter in a region 3 of Comparative Example 3.

The dried resin composition was further melt-kneaded at 220° C. in the twin-screw extruder, then introduced into a melt spinning pack at a spinning temperature of 210° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (65 mass % GBL aqueous solution; Ra=16) at 40° C. for 20 minutes (immersion step), and further immersed in distilled water for 10 minutes for washing to obtain a separation membrane. FIG. 9 is a histogram of an area ratio to a pore diameter in the region 3 of Comparative Example 3. The pore diameter distribution is narrow, and at the same time, the value of area average pore diameter $D_s$/number average pore diameter $D_n$ is also small. In addition, the pore diameter distribution is narrower than that of Example 1, and the value of area average pore diameter $D_s$/number average pore diameter $D_n$ is also smaller than that of Example 1.

Comparative Example 4

The main component A1 (25.0 mass %), the subcomponent B1 (5.0 mass %), the subcomponent B2 (67.5 mass %), the subcomponent C3 (2.4 mass %), and the antioxidant D1 (0.1 mass %) were melt-kneaded at 220° C. in a twin-screw extruder to prepare a resin composition for melt spinning (preparing step). The resin composition was vacuum-dried at 80° C. for 8 hours.

Figure 6:
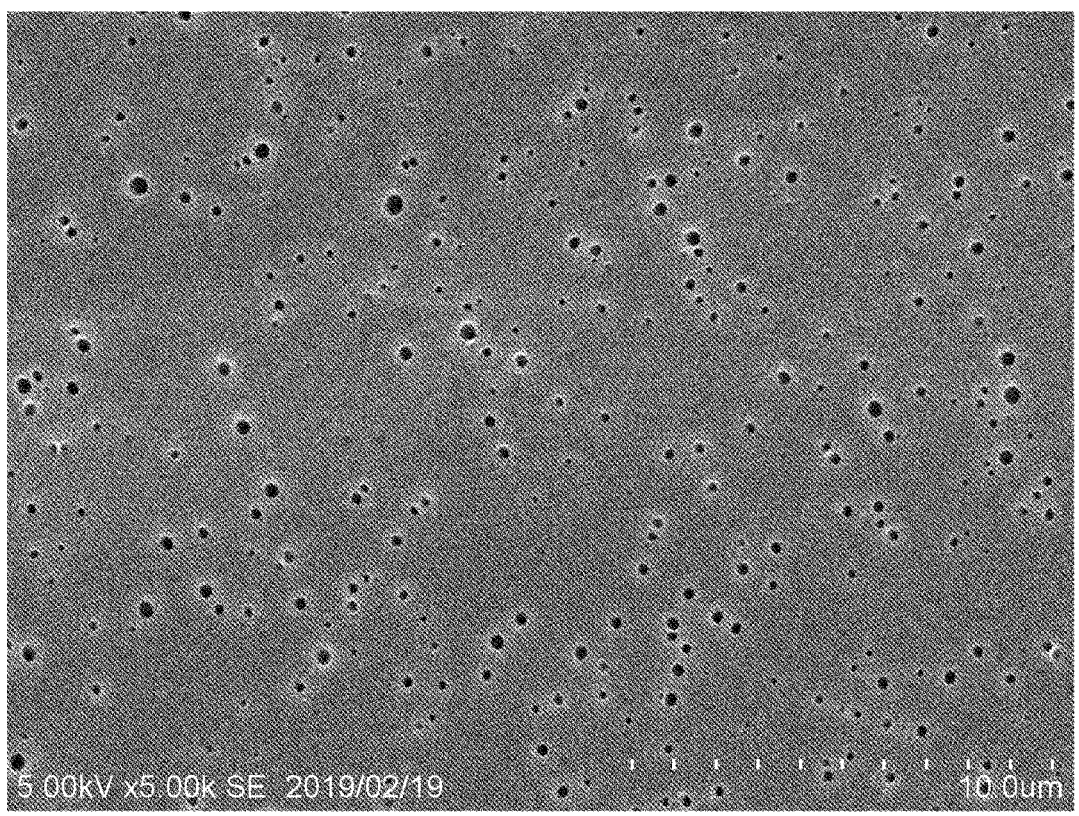
FIG. 6 is an SEM image of a center of a cross-sectional surface of Comparative Example 4.

The dried resin composition was further melt-kneaded at 220° C. in the twin-screw extruder, then introduced into a melt spinning pack at a spinning temperature of 210° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (water; Ra=39) at 25° C. for 24 hours (immersion step), and further immersed in distilled water for 10 minutes for washing to obtain a separation membrane. FIG. 6 is an SEM image of a center of a cross-sectional surface of Comparative Example 4. The size and the number of holes were smaller than those in Example 1.

Comparative Example 5

The main component A2 (82.0 mass %), the subcomponent B1 (16.9 mass %), the subcomponent B2 (67.5 mass %), the subcomponent C2 (1.0 mass %), and the antioxidant D1 (0.1 mass %) were melt-kneaded at 220° C. in a twin-screw extruder and pelletized to prepare a resin composition for melt spinning (preparing step). The resin composition was vacuum-dried at 80° C. for 8 hours.

The dried resin composition was further melt-kneaded at 235° C. in a twin-screw extruder, then introduced into a melt spinning pack at a spinning temperature of 235° C., and was spun downward from a mouthpiece having 72 mouthpiece holes (a type in which three arc-shaped slits were arranged to form one discharging hole, discharging hole radius: 0.60 mm, slit pitch: 0.10 mm, slit width: 0.08 mm) under the condition of a discharging amount of 60 g/min. The spun hollow fiber was guided to a cooling device so that a distance H from the lower surface of the mouthpiece to the upper end of the cooling device (chimney) was 30 mm, cooled by cooling air at 25° C. and a wind speed of 1.5 m/sec, converged by applying an oil agent, and then wound with a winder so that a draft ratio was 200. This resin formed body was immersed in a 50% ethanol aqueous solution to elute at least a part of the additive (C). Thereafter, the resin formed body was immersed in a 10 wt % aqueous solution of isopropyl alcohol for 1 hour to be hydrophilized.

Comparative Example 6

The main component A2 (70.0 mass %), the subcomponent B1 (9.9 mass %), the subcomponent C2 (20.0 mass %), and the antioxidant D1 (0.1 mass %) were melt-kneaded at 220° C. in a twin-screw extruder and pelletized to prepare a resin composition for melt spinning (preparing step). The resin composition was vacuum-dried at 80° C. for 8 hours.

The dried resin composition was further melt-kneaded at 235° C. in a twin-screw extruder, then introduced into a melt spinning pack at a spinning temperature of 235° C., and was spun downward from a mouthpiece having 72 mouthpiece holes (a type in which three arc-shaped slits were arranged to form one discharging hole, discharging hole radius: 0.60 mm, slit pitch: 0.10 mm, slit width: 0.08 mm) under the condition of a discharging amount of 60 g/min. The spun hollow fiber was guided to a cooling device so that a distance H from the lower surface of the mouthpiece to the upper end of the cooling device (chimney) was 30 mm, cooled by cooling air at 25° C. and a wind speed of 1.5 m/sec, converged by applying an oil agent, and then wound with a winder so that a draft ratio was 200. This resin formed body was immersed in a 50% ethanol aqueous solution to elute at least a part of the additive (C) (immersion step). Thereafter, the resin formed body was immersed in a 10 wt % aqueous solution of isopropyl alcohol for 1 hour to be hydrophilized.

Comparative Example 7

The main component A1 (25.0 mass %), the subcomponent B1 (5.0 mass %), the subcomponent B2 (67.5 mass %), the subcomponent C3 (2.4 mass %), and the antioxidant D1 (0.1 mass %) were melt-kneaded at 220° C. in a twin-screw extruder to prepare a resin composition for melt spinning (preparing step). The resin composition was vacuum-dried at 80° C. for 8 hours.

The dried resin composition was further melt-kneaded at 220° C. in the twin-screw extruder, then introduced into a melt spinning pack at a spinning temperature of 210° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min to form a resin formed product (forming step). The resin formed product, that is, the hollow fiber was guided to a cooling device, cooled by cooling air at 25° C. and a wind speed of 1.5 m/sec, and wound with a winder at a winding speed of 190 m/min. The resin formed body was immersed in an elution bath (65 mass % GBL aqueous solution; Ra=16) at 40° C. for 20 minutes (immersion step), and further immersed in distilled water for 10 minutes for washing to obtain a separation membrane. Further immersed in distilled water for 10 minutes for washing to obtain a separation membrane.

Comparative Example 8

Figure 7:
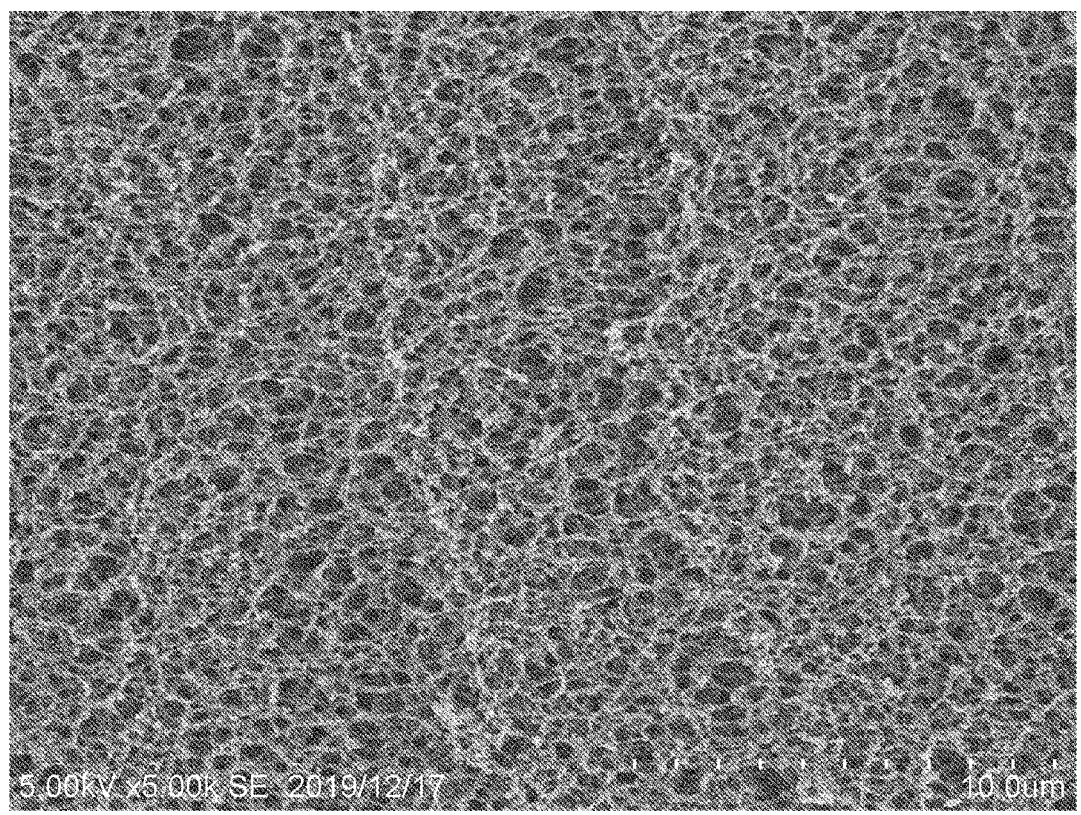
FIG. 7 is an SEM image of a center of a cross-sectional surface of Comparative Example 8.

An Advantec cellulose mixed ester type membrane filter A010A was used as it was. This is a common membrane having a highly uniform structure. FIG. 7 is an SEM image of a center of a cross-sectional surface of Comparative Example 8.

Comparative Example 9

The main component A3 (30.0 mass %), the subcomponent B3 (45.0 mass %), and the subcomponent C4 (25 mass %) were melt-kneaded at 250° C. in a twin-screw extruder and pelletized to prepare a resin composition (preparing step). The resin composition was vacuum-dried at 80° C. for 8 hours. The resin composition was melt-kneaded again at 250° C., homogenized, and then pelletized to prepare a resin composition for melt spinning (preparing step). The resin composition was vacuum-dried at 80° C. for 8 hours. The resin composition was non-uniform.

The dried resin composition was further melt-kneaded at 250° C. in a twin-screw extruder, then introduced into a melt spinning pack at a spinning temperature of 230° C., and discharged downward from an outer annular portion of a discharging mouthpiece having one mouthpiece hole (double cylindrical tube type, discharging hole diameter: 8.6 mm, slit width: 1.1 mm) under the condition of a discharging amount of 25 g/min (forming step). However, due to unstable discharging, the product could not be collected as a hollow fiber.

Comparative Example 10

The main component A1 (25.0 mass %), triethylene glycol (55 mass %), and calcium carbonate (10 mass %) having a particle diameter of 2.2 μm were melt-kneaded at 180° C. by a trace kneader (Imoto machinery Co., Ltd.), and discharged downward from an outer annular portion of a discharging mouthpiece having one mouthpiece hole (double circular tube type, discharging hole diameter: 8.6 mm, slit width: 1.1 mm) into a water coagulation bath. However, due to unstable discharging, it was difficult to collect the fiber.

Comparative Example 11

The main component A3 (25.0 mass %), sulfolane (75 mass %), and calcium carbonate (10 mass %) having a particle diameter of 2.2 μm were melt-kneaded at 230° C. by a trace kneader (Imoto machinery Co., Ltd.), and discharged downward from an outer annular portion of a discharging mouthpiece having one mouthpiece hole (double circular tube type, discharging hole diameter: 8.6 mm, slit width: 1.1 mm) into a water coagulation bath. However, due to unstable discharging, it was difficult to collect the fiber.

Tables 1 and 2 show the compositions at the time of the resin production step, and the conditions of the heat treatment step and the immersion step in Examples 1 to 7 and Comparative Examples 1 to 7. Table 3 and Table 4 show the physical properties of the separation membranes obtained in Examples 1 to 7 and Comparative Examples 1 to 8 or the used conventional membranes. The "region P" rows in Tables 3 and 4 indicate the number of the region that satisfies the conditions of the region P among the regions 1 to 5.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| A1 (mass %) | 25.0 | 25.0 | 25.0 | 25.0 | 25.0 | — | — |
| A2 (mass %) | — | — | — | — | — | — | — |
| A3 (mass %) | — | — | — | — | — | 30 | 30 |
| B1 (mass %) | 5.0 | 5.0 | 5.0 | 5.0 | 5.0 | — | — |
| B2 (mass %) | 60 | 60 | 60 | 55 | 68.5 | — | — |
| B3 (mass %) | — | — | — | — | — | 60 | 55 |
| C1 (mass %) | 9.9 | 9.9 | 9.9 | 14.9 | — | — | — |
| C2 (mass %) | — | — | — | — | 1.4 | — | — |
| C3 (mass %) | — | — | — | — | — | — | — |
| C4 (mass %) | — | — | — | — | — | 10 | 5 |
| D1 (mass %) | 0.1 | 0.1 | 0.1 | 0.1 | 0.1 | — | — |
| Number of times of melt-kneading (times) | 2 | 2 | 3 | 2 | 2 | 3 | 3 |
| State of resin formed body | Uniformly dispersed | Uniformly dispersed | Uniformly dispersed | Uniformly dispersed | Uniformly dispersed | Uniformly dispersed | Uniformly dispersed |
| Heat treatment temperature | 120° C. | 120° C. | — | 110° C. | 120° C. | — | — |
| Heat treatment time | 20 minutes | 20 minutes | — | 20 minutes | 20 minutes | — | — |
| Relaxation rate | 4.0% | 2.0% | — | 2.0% | 2.0% | — | — |
| Type of solvent θ | γ-butyrolactone aqueous solution | γ-butyrolactone aqueous solution | γ-butyrolactone aqueous solution | γ-butyrolactone aqueous solution | γ-butyrolactone aqueous solution | Ethanol aqueous solution | Ethanol aqueous solution |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| Weight concentration of organic solvent in solvent θ | 65% | 65% | 65% | 65% | 65% | 50% | 50% |
| Temperature of solvent θ | 40° C. | 40° C. | 40° C. | 40° C. | 40° C. | 50° C. | 50° C. |
| Solubility parameter distance of solvent θ to main component ($MPa^{0.5}$) | 16 | 16 | 16 | 16 | 16 | 28 | 28 |
| Solubility parameter distance of organic solvent in solvent θ to main component ($MPa^{0.5}$) | 5.6 | 5.6 | 5.6 | 5.6 | 5.6 | 4.3 | 4.3 |
| δh of Hansen solubility parameter of solvent θ | 20 | 20 | 20 | 20 | 20 | 31 | 31 |

TABLE 2

|  | Comparative Ex. 1 | Comparative Ex. 2 | Comparative Ex. 3 | Comparative Ex. 4 | Comparative Ex. 5 | Comparative Ex. 6 | Comparative Ex. 7 |
|---|---|---|---|---|---|---|---|
| A1 (mass %) | 25.0 | 25.0 | 25.0 | 25.0 | — | — | 25.0 |
| A2 (mass %) | — | — | — | — | 82.0 | 70.0 | — |
| A3 (mass %) | — | — | — | — | — | — | — |
| B1 (mass %) | 5.0 | 5.0 | 5.0 | 5.0 | 16.9 | 9.9 | 5.0 |
| B2 (mass %) | 60 | 60 | 69.9 | 67.5 | — | — | 67.5 |
| B3 (mass %) | — | — | — | — | — | — | — |
| C1 (mass %) | 9.9 | 9.9 | — | — | — | — | — |
| C2 (mass %) | — | — | — | — | 1 | 20 | — |
| C3 (mass %) | — | — | — | 2.4 | — | — | 2.4 |
| C4 (mass %) | — | — | — | — | — | — | — |
| D1 (mass %) | 0.1 | 0.1 | 0.1 | 0.1 | 0.1 | 0.1 | 0.1 |
| Number of times of melt-kneading (times) | 3 | 3 | 2 | 2 | 2 | 2 | 2 |
| State of resin formed body | Uniformly dispersed | Uniformly dispersed | Uniformly dispersed | Non-uniform | Non-uniform | Non-uniform | Non-uniform |
| Heat treatment temperature | — | — | — | — | — | — | — |
| Heat treatment time | — | — | — | — | — | — | — |
| Relaxation rate | — | — | — | — | — | — | — |
| Type of solvent θ | Water | γ-butyrolactone aqueous solution | γ-butyrolactone aqueous solution | Water | Ethanol aqueous solution | Ethanol aqueous solution | γ-butyrolactone aqueous solution |
| Weight concentration of organic solvent in solvent θ | 0% | 90% | 65% | 0% | 50% | 50% | 65% |
| Temperature of solvent θ | 25° C. | 40° C. | 40° C. | 25° C. | 25° C. | 25° C. | 40° C. |
| Solubility parameter distance of solvent θ to main component ($MPa^{0.5}$) | 39 | 8 | 16 | 39 | 28 | 28 | 16 |
| Solubility parameter distance of organic solvent in solvent θ to main component ($MPa^{0.5}$) | — | 5.6 | 5.6 | — | 18 | 18 | 5.6 |
| δh of Hansen solubility parameter of solvent θ | 48 | 11 | 20 | 48 | 31 | 31 | 20 |

TABLE 3

|  |  | Ex. 1 | Ex. 2 | Ex. 3 | Ex. 4 | Ex. 5 | Ex. 6 | Ex. 7 |
|---|---|---|---|---|---|---|---|---|
| Number average pore diameter $D_n$ (nm) | Region 1 | 465 | 474 | 487 | 522 | 487 | 303 | 256 |
|  | Region 2 | 443 | 392 | 476 | 485 | 464 | 272 | 268 |
|  | Region 3 | 383 | 447 | 540 | 523 | 515 | 269 | 271 |
|  | Region 4 | 410 | 430 | 453 | 453 | 492 | 263 | 266 |
|  | Region 5 | 412 | 499 | 485 | 513 | 512 | 312 | 254 |
| Area average pore diameter $D_s$ (nm) | Region 1 | 1513 | 1643 | 1489 | 1592 | 1641 | 1072 | 635 |
|  | Region 2 | 1479 | 1181 | 1566 | 1387 | 1530 | 1322 | 515 |
|  | Region 3 | 1711 | 1408 | 1911 | 1423 | 1680 | 1355 | 630 |
|  | Region 4 | 1466 | 1365 | 1547 | 1365 | 1532 | 1265 | 520 |
|  | Region 5 | 1513 | 1483 | 1450 | 1543 | 1605 | 1115 | 671 |
| Area average pore diameter ($D_s$)/number average pore diameter ($D_n$) (—) | Region 1 | 3.3 | 3.5 | 3.1 | 3.0 | 3.4 | 3.5 | 2.5 |
|  | Region 2 | 3.3 | 3.0 | 3.3 | 2.9 | 3.3 | 4.9 | 1.9 |
|  | Region 3 | 4.5 | 3.2 | 3.5 | 2.7 | 3.3 | 5.0 | 2.3 |
|  | Region 4 | 3.6 | 3.2 | 3.4 | 3.0 | 3.1 | 4.8 | 2.0 |
|  | Region 5 | 3.7 | 3.0 | 3.0 | 3.0 | 3.1 | 3.6 | 2.6 |
|  | Average | 3.7 | 3.2 | 3.3 | 2.9 | 3.2 | 4.4 | 2.3 |

TABLE 3-continued

|  |  | Ex. 1 | Ex. 2 | Ex. 3 | Ex. 4 | Ex. 5 | Ex. 6 | Ex. 7 |
|---|---|---|---|---|---|---|---|---|
| Number average pore diameter changing rate $\alpha_i$ (—) | Region 1 | 0.05 | 0.17 | 0.02 | 0.07 | 0.05 | 0.10 | −0.05 |
|  | Region 2 | 0.14 | −0.14 | −0.13 | −0.08 | −0.11 | 0.01 | −0.01 |
|  | Region 3 | −0.07 | 0.04 | 0.16 | 0.13 | 0.04 | 0.02 | 0.02 |
|  | Region 4 | 0.00 | −0.16 | −0.07 | −0.13 | −0.04 | −0.19 | 0.05 |
|  | Region 5 | 0.00 | 0.14 | 0.07 | 0.12 | 0.04 | 0.16 | −0.05 |
| $L_a$ | Region 1 | 3099 | 3202 | 2901 | 2892 | 2790 | 2539 | 1641 |
|  | Region 2 | 2826 | 2868 | 2899 | 2357 | 2709 | 2625 | 1474 |
|  | Region 3 | 3660 | 2998 | 3801 | 2757 | 2983 | 2697 | 1722 |
|  | Region 4 | 2745 | 3702 | 2725 | 2362 | 2723 | 2530 | 1552 |
|  | Region 5 | 2868 | 4781 | 3051 | 2620 | 3105 | 2628 | 1664 |
| $(L_a - D_s)/D_n$ (—) | Region 1 | 3.4 | 3.3 | 2.9 | 2.5 | 2.4 | 4.8 | 3.9 |
|  | Region 2 | 3.0 | 4.3 | 2.8 | 2.0 | 2.5 | 4.8 | 3.6 |
|  | Region 3 | 5.1 | 3.6 | 3.5 | 2.6 | 2.5 | 5.0 | 4.0 |
|  | Region 4 | 3.1 | 5.4 | 2.6 | 2.2 | 2.4 | 4.8 | 3.9 |
|  | Region 5 | 3.3 | 6.6 | 3.3 | 2.1 | 2.9 | 4.9 | 3.9 |
|  | Average | 3.6 | 4.6 | 3.0 | 2.3 | 2.6 | 4.9 | 3.9 |
| Variation coefficient of $L_a$ (%) | Region 1 | 32 | 23 | 26 | 26 | 25 | 36 | 32 |
|  | Region 2 | 33 | 19 | 28 | 33 | 26 | 39 | 31 |
|  | Region 3 | 37 | 30 | 26 | 43 | 25 | 42 | 32 |
|  | Region 4 | 31 | 31 | 27 | 32 | 25 | 37 | 32 |
|  | Region 5 | 36 | 31 | 28 | 34 | 27 | 33 | 31 |
|  | Average | 33.7 | 26.7 | 26.8 | 33.5 | 25.8 | 37.4 | 31.5 |
| W (number) | Region 1 | 21.7 | 14.1 | 13.7 | 11.3 | 13.4 | 12.2 | 11.8 |
|  | Region 2 | 14.4 | 14.5 | 13.9 | 11.0 | 12.7 | 12.8 | 9.6 |
|  | Region 3 | 28.5 | 13.4 | 15.7 | 10.0 | 12.3 | 14.3 | 12.6 |
|  | Region 4 | 15.7 | 14.1 | 12.5 | 9.4 | 12.5 | 13.0 | 11.2 |
|  | Region 5 | 17.3 | 14.6 | 14.3 | 9.9 | 12.2 | 13.2 | 12.3 |
|  | Average | 19.5 | 14.1 | 14.0 | 10.3 | 12.6 | 13.1 | 11.5 |
| Area ratio (%) occupied by fine pores | Region 1 | 9.4 | 7.6 | 12.3 | 6.9 | 5.8 | 8.9 | 11.6 |
|  | Region 2 | 8.9 | 10.3 | 12.1 | 7.2 | 5.9 | 8.3 | 12.3 |
|  | Region 3 | 8.6 | 10.1 | 13.1 | 7.9 | 6.2 | 8.1 | 12.5 |
|  | Region 4 | 8.3 | 12.1 | 11.2 | 7.6 | 5.8 | 7.9 | 11.9 |
|  | Region 5 | 7.9 | 8.7 | 12.6 | 8.3 | 6.0 | 9.2 | 11.2 |
|  | Average | 8.6 | 9.8 | 12.3 | 7.6 | 5.9 | 8.5 | 11.9 |
| Region P |  | 1, 2, 3, 4, 5 | 1, 2, 3, 4, 5 | 1, 2, 3, 4, 5 | 1, 2, 3 | 1, 2, 3, 4, 5 | 1, 2, 3, 4, 5 | 1, 5 |
| Separation membrane thickness (μm) |  | 78.5 | 79.5 | 79.0 | 79.0 | 79.5 | 73.0 | 72.0 |
| Outer diameter (μm) |  | 428 | 432 | 430 | 431 | 432 | 422 | 429 |
| Inner diameter (μm) |  | 271 | 273 | 272 | 273 | 273 | 276 | 285 |
| Weight ratio (wt %) of main component A to total |  | 95.8 | 96.3 | 96 | 96.5 | 96.7 | — | — |
| Surface concentration (atomic %) of hydrophilic polymer |  | 41 | 42 | 42 | 44 | 39 | — | — |
| Porosity (%) |  | 72 | 72 | 73 | 71 | 73 | — | — |
| Area ratio (%) occupied by macro voids to total cross section area |  | 1 | 0 | 0 | 0 | 0 | 0 | 0 |
| Strength at break (MPa) |  | 8.3 | 8.3 | 7.2 | 7.2 | 7.0 | 8.8 | 9.1 |
| Membrane permeation flux (m³/m²/h) |  | 1.85 | 2.54 | 1.91 | 3.13 | 3.41 | 0.55 | 0.49 |
| Latex rejection rate (%) |  | 98.2 | 97.8 | 99.0 | 90.5 | 92.1 | 99.2 | 99.5 |
| Membrane lifetime (mL) |  | 47 | 53 | 48 | 67 | 68 | 29 | 24 |

TABLE 4

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Number average pore diameter $D_n$ (nm) | Region 1 | — | — | 443 | 179 | 43 | 235 | 562 | 267 |
|  | Region 2 | — | — | 445 | 183 | 45 | 243 | 495 | 268 |
|  | Region 3 | — | — | 425 | 180 | 48 | 258 | 547 | 271 |
|  | Region 4 | — | — | 484 | 182 | 46 | 230 | 489 | 264 |
|  | Region 5 | — | — | 471 | 176 | 44 | 220 | 535 | 276 |
| Area average pore diameter $D_s$ (nm) | Region 1 | — | — | 927 | 241 | 52 | 271 | 1257 | 420 |
|  | Region 2 | — | — | 1009 | 259 | 57 | 285 | 1100 | 412 |
|  | Region 3 | — | — | 831 | 225 | 56 | 324 | 1164 | 427 |
|  | Region 4 | — | — | 958 | 231 | 60 | 298 | 1200 | 414 |
|  | Region 5 | — | — | 1074 | 249 | 52 | 267 | 1373 | 431 |
| Area average pore diameter ($D_s$)/number average pore diameter ($D_n$) (—) | Region 1 | — | — | 2.1 | 1.3 | 1.2 | 1.2 | 2.2 | 1.6 |
|  | Region 2 | — | — | 2.3 | 1.4 | 1.3 | 1.2 | 2.2 | 1.6 |
|  | Region 3 | — | — | 2.0 | 1.3 | 1.2 | 1.3 | 2.1 | 1.6 |
|  | Region 4 | — | — | 2.0 | 1.3 | 1.3 | 1.3 | 2.5 | 1.5 |
|  | Region 5 | — | — | 2.3 | 1.4 | 1.2 | 1.2 | 2.6 | 1.6 |
|  | Average | — | — | 2.1 | 1.3 | 1.2 | 1.2 | 2.3 | 1.6 |
| Number average pore diameter changing rate $\alpha i$ (—) | Region 1 | — | — | −0.01 | −0.02 | −0.05 | −0.03 | 0.12 | 0.04 |
|  | Region 2 | — | — | 0.04 | 0.02 | −0.07 | −0.06 | −0.11 | −0.03 |
|  | Region 3 | — | — | −0.14 | −0.01 | 0.04 | 0.11 | 0.11 | 0.01 |
|  | Region 4 | — | — | 0.03 | 0.03 | 0.04 | 0.04 | −0.09 | −0.05 |

TABLE 4-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
|  | Region 5 | — | — | −0.03 | −0.03 | −0.05 | −0.05 | 0.09 | 0.04 |
| $L_a$ | Region 1 | — | — | 1990 | 1440 | 1553 | 1282 | 2027 | 855 |
|  | Region 2 | — | — | 1868 | 1427 | 1668 | 1379 | 1793 | 862 |
|  | Region 3 | — | — | 1715 | 1438 | 1798 | 1599 | 2143 | 899 |
|  | Region 4 | — | — | 1897 | 1421 | 1583 | 1402 | 2139 | 884 |
|  | Region 5 | — | — | 1820 | 1486 | 1544 | 1303 | 2448 | 922 |
| $(L_a - D_s)/D_n$ (—) | Region 1 | — | — | 2.4 | 6.7 | 34.9 | 4.3 | 1.4 | 1.6 |
|  | Region 2 | — | — | 1.9 | 6.4 | 35.8 | 4.5 | 1.4 | 1.7 |
|  | Region 3 | — | — | 2.1 | 6.7 | 36.3 | 4.9 | 1.8 | 1.7 |
|  | Region 4 | — | — | 1.9 | 6.5 | 33.1 | 4.8 | 1.9 | 1.8 |
|  | Region 5 | — | — | 1.6 | 7.0 | 33.9 | 4.7 | 2.0 | 1.8 |
|  | Average | — | — | 2.0 | 6.7 | 34.8 | 4.7 | 1.7 | 1.7 |
| Variation coefficient of $L_a$ (%) | Region 1 | — | — | 29 | 53 | 59 | 69 | 28 | 30 |
|  | Region 2 | — | — | 33 | 55 | 68 | 64 | 28 | 28 |
|  | Region 3 | — | — | 29 | 54 | 53 | 66 | 28 | 29 |
|  | Region 4 | — | — | 32 | 54 | 67 | 60 | 27 | 29 |
|  | Region 5 | — | — | 28 | 59 | 65 | 62 | 27 | 29 |
|  | Average | — | — | 30.2 | 55.1 | 62.4 | 64.3 | 27.4 | 29.0 |
| W (number) | Region 1 | — | — | 6.4 | 1.7 | 2.0 | 1.9 | 5.3 | 4.4 |
|  | Region 2 | — | — | 5.1 | 1.3 | 2.3 | 2.0 | 5.1 | 4.4 |
|  | Region 3 | — | — | 6.2 | 1.6 | 2.4 | 2.0 | 5.9 | 4.8 |
|  | Region 4 | — | — | 6.1 | 1.2 | 1.9 | 2.5 | 7.3 | 4.5 |
|  | Region 5 | — | — | 4.7 | 1.9 | 1.9 | 2.2 | 8.1 | 4.9 |
|  | Average | — | — | 5.7 | 1.5 | 2.1 | 2.1 | 6.3 | 4.6 |
| Area ratio (%) occupied by fine pores | Region 1 | — | — | 14.1 | 25.9 | 24.8 | 22.4 | 9.0 | 21.9 |
|  | Region 2 | — | — | 13.1 | 22.1 | 25.3 | 22.5 | 9.2 | 21.8 |
|  | Region 3 | — | — | 15.4 | 27.5 | 21.4 | 26.0 | 9.4 | 21.2 |
|  | Region 4 | — | — | 13.1 | 21.5 | 25.0 | 22.0 | 8.5 | 21.5 |
|  | Region 5 | — | — | 11.5 | 27.1 | 23.7 | 24.9 | 7.6 | 21.5 |
|  | Average | — | — | 13.4 | 24.8 | 24.0 | 23.6 | 8.7 | 21.6 |
| Region P |  | — | — | — | — | — | — | — | — |
| Separation membrane thickness (μm) |  | 75.0 | — | 77.5 | 76.5 | 18.0 | 8.1 | 80.0 | 110 |
| Outer diameter (μm) |  | 405 | — | 427 | 409 | 69 | 43 | 428 | — |
| Inner diameter (μm) |  | 255 | — | 272 | 256 | 33 | 27 | 268 | — |
| Weight ratio (wt %) of main component A to total |  | — | — | 90.2 | — | — | — | 94.9 | 100 |
| Surface concentration (atomic %) of hydrophilic polymer |  | — | — | 12 | — | — | — | 35 | — |
| Porosity (%) |  | — | — | 70 | — | 1.5 | 32 | 71 | 65 |
| Area ratio (%) occupied by macro voids to total cross section area |  | 0 | 0 | 3 | 0 | 0 | 0 | 5 | 0 |
| Strength at break (MPa) |  | — | — | 6.8 | — | 106 | 74 | 6.6 | 13.4 |
| Membrane permeation flux (m³/m²/h) |  | 0.1 or less | — | 1.39 | 0.1 or less | 0.1 or less | 0.1 or less | 3.6 | 1.63 |
| Latex rejection rate (%) |  | — | — | 99.2 | — | — | — | 36.8 | 8 |
| Membrane lifetime (mL) |  | — | — | 31 | — | — | — | 104 | 25 |

In each of Examples 1 to 7, both the long lifetime and the high rejection ratio are achieved when the region P is contained in which both the value of area average pore diameter $D_s$/number average pore diameter $D_n$ and the number average W are high. In Comparative Example 1, since the affinity for the main component of a plasticizing bath to be used in the immersion step was low, phase separation did not occur, and the separation membrane did not have a porous structure. Comparative Example 3 prepared from the resin composition not containing the subcomponent C has low water permeability because the value of area average pore diameter $D_s$/number average pore diameter $D_n$ is small. In Comparative Examples 4, 5, and 6, the value of area average pore diameter $D_s$/number average pore diameter $D_n$, and the number average W are small, and the area ratio occupied by pores having a pore diameter smaller than the number average pore diameter is high, and thus the permeation flux is small. It is considered that this is because the holes do not communicate with each other. Meanwhile, in Comparative Example 7, the area ratio occupied by the pores having a pore diameter smaller than the number average pore diameter is smaller than those in Comparative Examples 4, 5, and 6, and a large number of large pores are present, so that the permeation flux is high and the lifetime is long. However, in Comparative Example 7, the number average W was smaller and the separation performance was lower than that in Examples 1 to 7. It is considered that this is because fine pores do not exist around the coarse pores. It is presumed that this is because the island component became the core and phase separation occurred due to the non-uniformity of the resin formed body. Comparative Example 8 has a structure with high uniformity and has high strength, but has low separation performance and water permeability. In Comparative Example 8, since the value of area average pore diameter $D_s$/number average pore diameter $D_n$ is small as in Comparative Example 3, the water permeability is low. It can be seen from Comparative Example 9 that when the subcomponent C is 20% or more, forming becomes difficult. It is considered that when the amount of the subcomponent C was increased, a non-uniform resin composition was obtained, and the processability decreased. In addition, with reference to Patent Literature 6, phase separation of a solution to which salt particles were added was attempted, but collection of hollow fibers was difficult (Comparative Examples 10 and 11). It is considered that this is because the addition of salt particles resulted in a non-uniform solution and the membrane strength decreased.

Although the present invention has been described in detail with reference to specific embodiments, it will be apparent to those skilled in the art that various changes and modifications can be made without departing from the spirit and scope of the present invention.

The invention claimed is:

1. A separation membrane comprising, as a main component A, a thermoplastic polymer selected from the group consisting of a cellulose ester and a polyamide,
   wherein, when regions obtained by dividing a cross-sectional surface perpendicular to a longitudinal direction of the separation membrane into 5 at an equal interval in order from one surface of the separation membrane in a thickness direction of the separation membrane are defined as regions 1 to 5,
   an average pore diameter obtained by weighting with a pore area ratio of pores extracted in each region to a total area of all the pores is defined as an area average pore diameter $D_s$ in each region,
   an average pore diameter obtained by weighting with a number ratio of pores extracted in each region to the number of all pores is defined as a number average pore diameter $D_n$ in each region,
   a pore having a pore diameter larger than the area average pore diameter $D_s$ is defined as a coarse pore,
   a pore having a pore diameter smaller than the number average pore diameter $D_n$ is defined as a fine pore,
   an average of closest distance between coarse pores is defined as $L_a$, and
   a number average W of the fine pores that are located at a distance smaller than $L_a$ from a center of the respective coarse pores is calculated,
   all the regions 1 to 5 have a number average pore diameter changing rate $\alpha_i$ defined by the following Formula of −0.25 or more and 0.25 or less, and
   at least one of the regions 1 to 5 is a region P that satisfies the following conditions (a) and (b):
   (a) a value of the area average pore diameter $D_s$/the number average pore diameter $D_n$ is 2.50 or more and 6.00 or less; and
   (b) the number average W of the fine pores is 10 or more and 30 or less, $\alpha_i = (D_i - D_{i+1})/D_i$ ($D_i$: Number average pore diameter of region i),
   it is noted that the number average pore diameter changing rate in the region 5 is defined by the following formula, $\alpha_5 = (D_5 - D_4)/D_5$.

2. The separation membrane according to claim 1, wherein an area ratio occupied by the fine pores in the region P is 3% or more and 20% or less.

3. The separation membrane according to claim 1, wherein $(L_a - D_s)/D_n$ of the region P is 2.1 or more and 7.5 or less.

4. The separation membrane according to claim 1, wherein a variation coefficient of $L_a$ in the region P is 50% to 0.1%.

5. The separation membrane according to claim 1, wherein all of the regions 1 to 5 are the region P.

6. The separation membrane according to claim 1, wherein an area ratio of pores having a pore diameter of 1600 nm to 3000 nm to all pores in the region P is 50% or more.

7. The separation membrane according to claim 1, wherein a variation coefficient of the pores having a pore diameter of 1600 nm to 3000 nm in the region P is 40% or less.

8. The separation membrane according to claim 1, wherein a content of the main component A is 95 mass % or more when a total content of components of the separation membrane is defined as 100 mass %.

9. The separation membrane according to claim 1, further comprising a hydrophilic polymer other than the main component A, wherein an element ratio of the hydrophilic polymer to the main component A is 15 atomic % or more in a surface concentration calculated by X-ray photoelectron analysis (ESCA) measurement.

10. The separation membrane according to claim 1, further comprising at least one selected from the group consisting of a cellulose ester, a cellulose ether, a polyamide, a poly-fatty acid vinyl ester, polyvinylpyrrolidone, polyethylene oxide, polypropylene oxide, a polyacrylic acid ester, a polymethacrylic acid ester, and a copolymer thereof as a component other than the main component A.

11. The separation membrane according to claim 1, further comprising at least one selected from the group consisting of a polyacrylic acid ester, a polymethacrylic acid ester, and a copolymer thereof as a component other than the main component A.

12. The separation membrane according to claim 1, further comprising at least one selected from the group consisting of a polyvinylpyrrolidone and a copolymer containing a polyvinylpyrrolidone component as a component other than the main component A.

13. The separation membrane according to claim 12, further comprising a copolymer of fatty acid vinyl and vinylpyrrolidone as a component other than the main component A.

14. The separation membrane according to claim 1, having a hollow fiber shape.

15. The separation membrane according to claim 1, wherein an area ratio occupied by macro voids to an entire cross-sectional area in the cross-sectional surface perpendicular to the longitudinal direction of the separation membrane is 10% or less.

* * * * *